(12) United States Patent
Ohta

(10) Patent No.: US 6,963,388 B1
(45) Date of Patent: Nov. 8, 2005

(54) FOCUS ADJUSTMENT APPARATUS, CONTROL METHOD THEREFOR, AND MEDIUM FOR SUPPLYING CONTROL PROGRAM THEREFOR

(75) Inventor: Seiya Ohta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 09/649,128

(22) Filed: Aug. 28, 2000

(30) Foreign Application Priority Data

Aug. 31, 1999 (JP) .......................... 11-245272
Aug. 7, 2000 (JP) ....................... 2000-239115

(51) Int. Cl.⁷ ............................................ H04N 5/232
(52) U.S. Cl. ..................... 349/349; 348/349; 348/348; 348/345
(58) Field of Search ................. 348/345, 349, 348/335, 351, 354, 356, 355, 337, 336, 363, 272, 362, 273, 263, 279, 280; 396/93

(56) References Cited

U.S. PATENT DOCUMENTS

| | | | | |
|---|---|---|---|---|
| 4,804,831 A | * | 2/1989 | Baba et al. ............... | 250/201.2 |
| 5,055,665 A | * | 10/1991 | Baba et al. ............... | 250/201.7 |
| 5,124,842 A | * | 6/1992 | Honda et al. .............. | 359/561 |
| 5,192,998 A | * | 3/1993 | Tokumitsu et al. ......... | 348/349 |
| 5,337,152 A | * | 8/1994 | Kotaki ....................... | 348/234 |
| 5,347,371 A | * | 9/1994 | Nishimura et al. ......... | 358/453 |
| 5,396,336 A | * | 3/1995 | Yoshii et al. ............... | 348/345 |
| 5,751,354 A | * | 5/1998 | Suzuki et al. ............... | 348/349 |
| 6,088,059 A | * | 7/2000 | Mihara et al. .............. | 348/335 |
| 6,249,317 B1 | * | 6/2001 | Hashimoto et al. ......... | 348/364 |

FOREIGN PATENT DOCUMENTS

JP 62-103616 5/1987

OTHER PUBLICATIONS

Josep Garcia, Juan M. Sanchez, Xavier Orriols and Xavier Binefa. "Chromatic aberration and depth extraction"; Sep. 3–7, 2000 pp. 762–765 vol. 1 Pattern Recognition, 2000. Proceedings. 15th International Conference.*

* cited by examiner

*Primary Examiner*—Wendy R. Garber
*Assistant Examiner*—Nelson D. Hernandez
(74) *Attorney, Agent, or Firm*—Morgan & Finnegan, LLP

(57) ABSTRACT

This invention provides an apparatus such as a focus adjustment apparatus capable appropriately adjusting focusing in accordance with chromatic aberration, a control method therefor, and a medium such as a storage medium for supplying a control program therefor. An apparatus such as a focus adjustment apparatus which forms a plurality of color component signals corresponding to predetermined different color components of object light received through an optical system, and forms a signal for focus adjustment on the basis of a signal formed by changing a ratio of the plurality of color component signals formed, a control-method therefor, and a medium such as a storage medium for supplying a control program therefor are provided.

35 Claims, 21 Drawing Sheets

FIG. 2
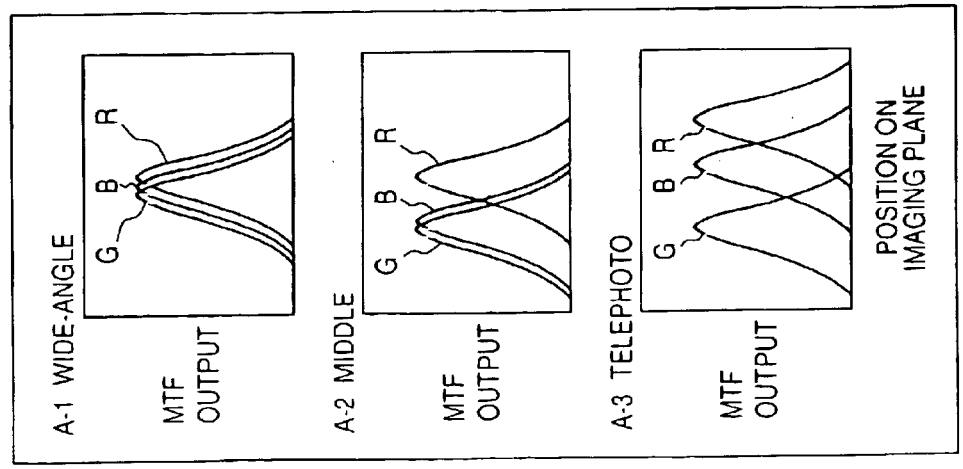
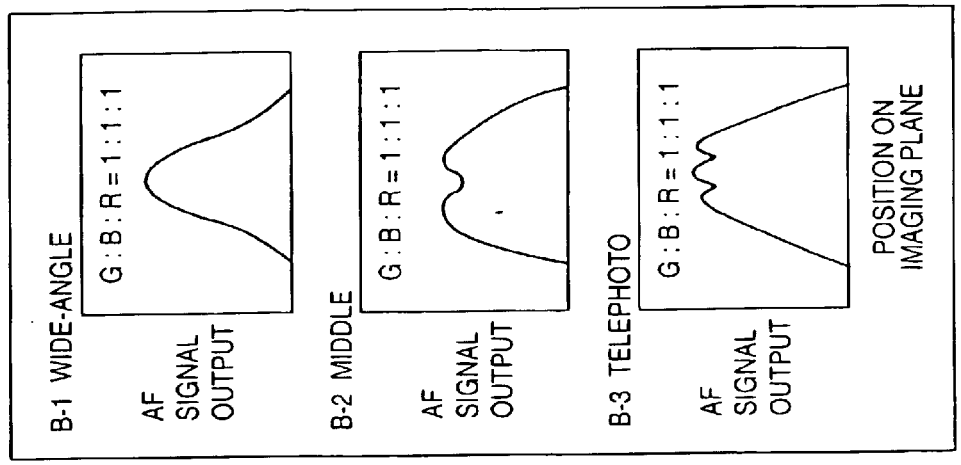
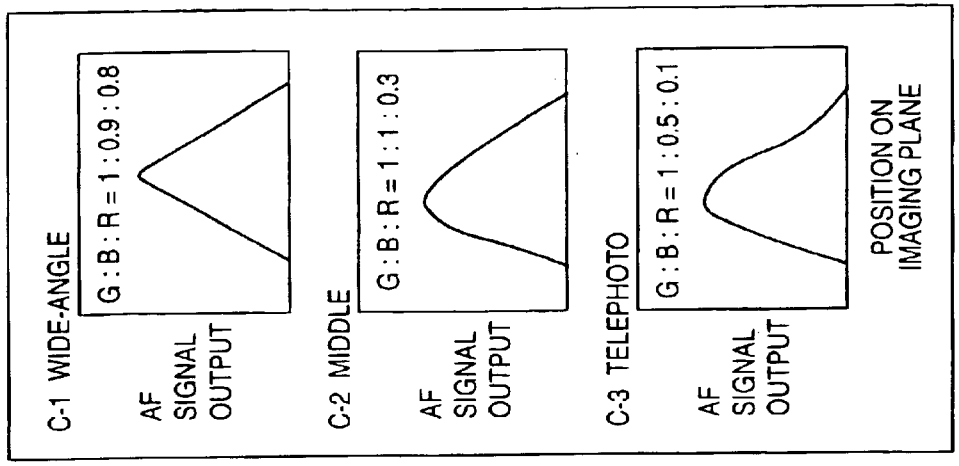

FIG. 6
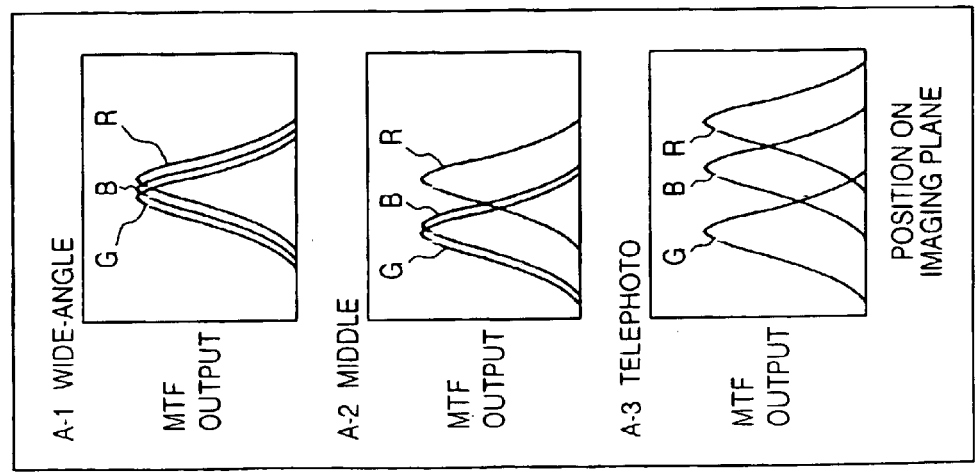
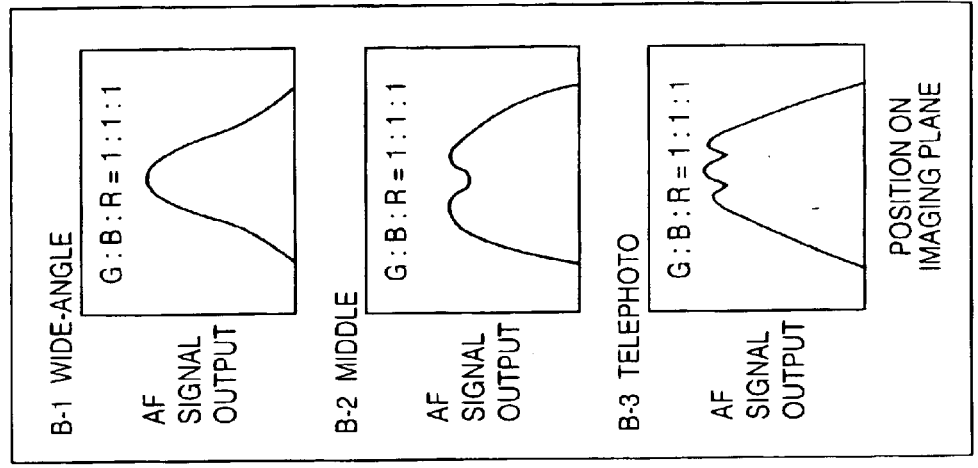
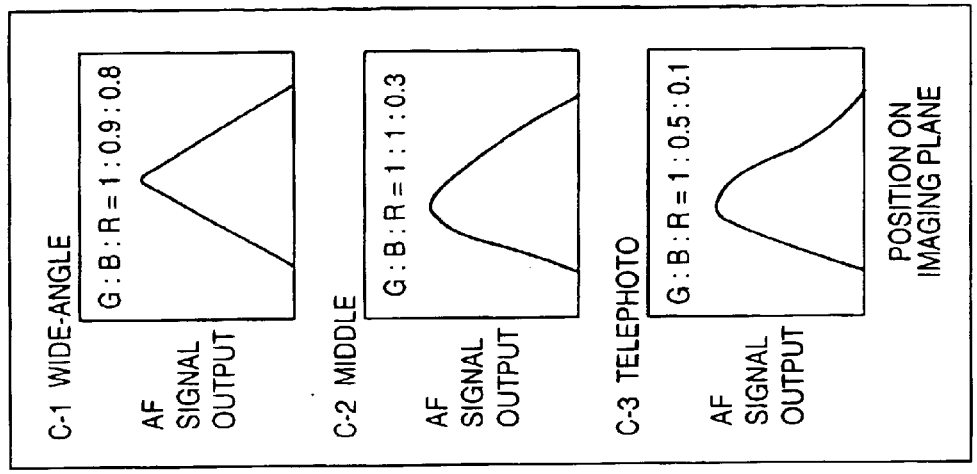

FIG. 15
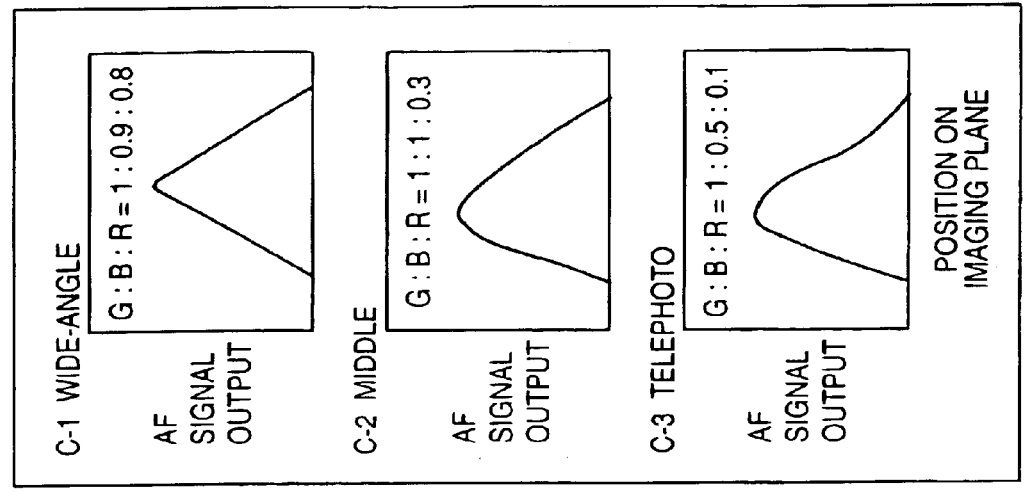
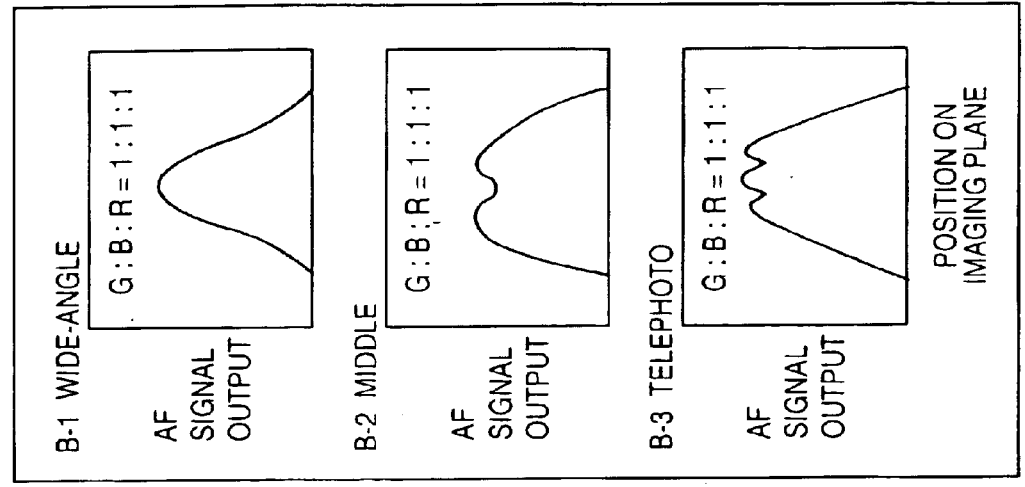
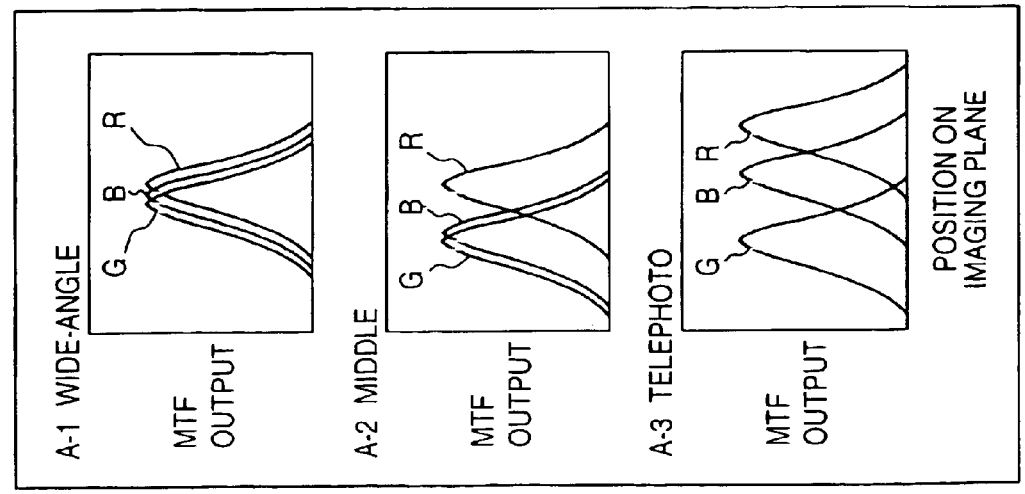

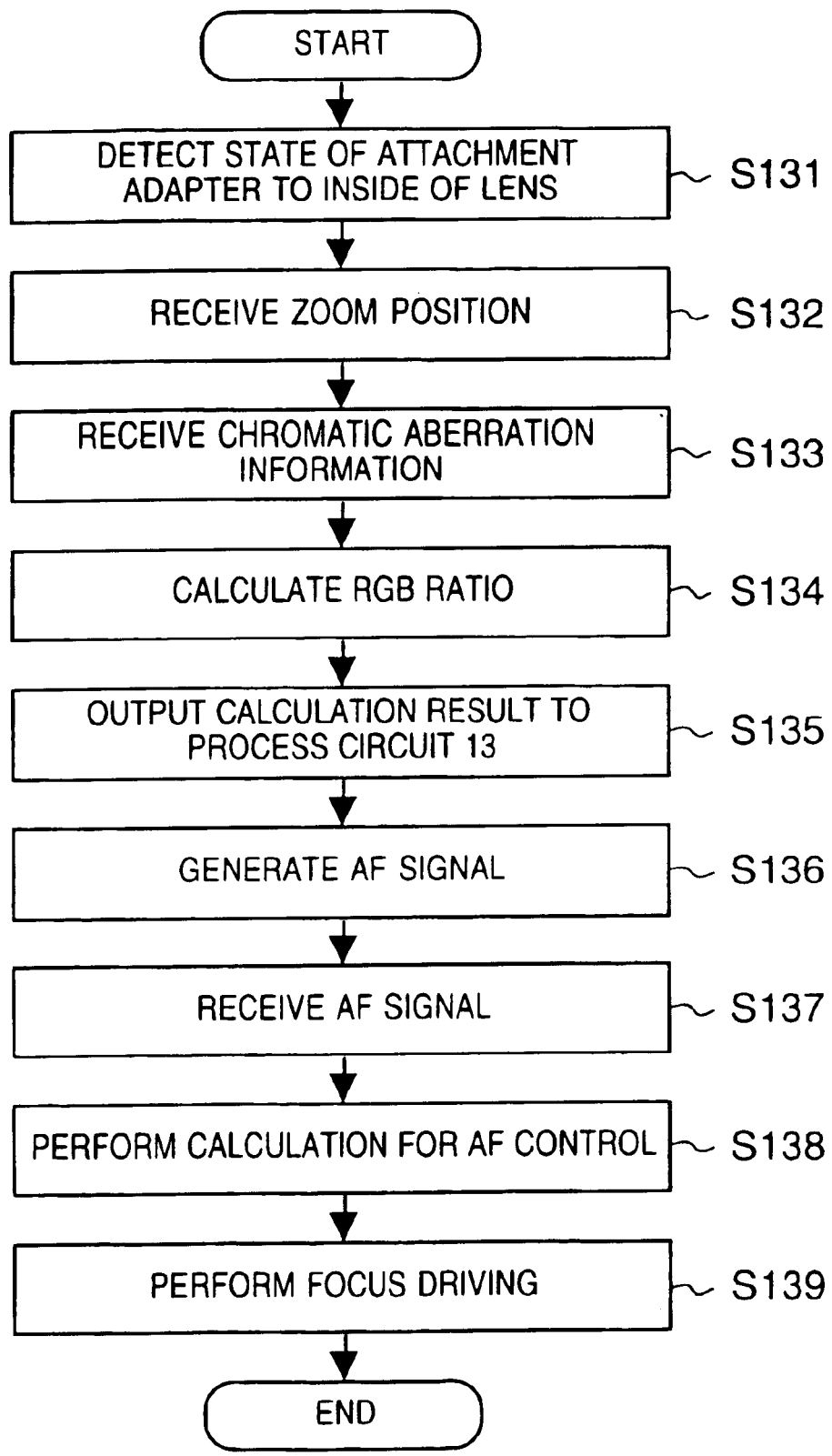

FOCUS ADJUSTMENT APPARATUS, CONTROL METHOD THEREFOR, AND MEDIUM FOR SUPPLYING CONTROL PROGRAM THEREFOR

FIELD OF THE INVENTION

The present invention relates to a focus adjustment apparatus for an image sensing apparatus such as a digital camera or video camera, a control method therefor, and a medium for supplying the control program therefor.

BACKGROUND OF THE INVENTION

Conventionally, as the automatic focusing function (to be referred to as the AF function hereinafter) of a camera, a hill-climbing scheme has been proposed by, e.g., Japanese Patent Laid-Open No. 62-103616 and known. In recent years, as image sensing apparatuses used for video cameras, 3-CCD type apparatuses used by broadcasting stations or for operational use have been widely used. Accordingly, the image quality increasingly improves, and the focusing accuracy is also rapidly increasing. This tendency is expected to be strong in the future.

For lenses as well, along with intensive competition for values added and discriminations, the magnification becomes high, and the AF accuracy of a lens is required to be high.

However, in the conventional image sensing apparatus, the high image quality by the 3-CCD scheme and the high magnification of a lens are inconsistent from the viewpoint of improvement of they AF function. This is a very important subject of study.

Since a lens has chromatic aberration due to its optical characteristics, all color components do not always form images on the same plane. More specifically, in the 3-CCD scheme in which a light beam the CCDs have different focus positions. Especially, a zoom lens capable of changing its magnification can hardly focus all chromatic aberrations at the respective zoom positions onto the same plane and is impractical.

In recent years, a higher magnification is required. Conversely, as the magnification increases, the chromatic aberration tends to be enlarged. An enlarged chromatic aberration means that, for example, even when a green object is in focus, red and blue objects on the same plane separate from the best focus state due to the high magnification.

In some systems, an attachment lens is attached to the front portion of a lens, or the camera and lens are interchangeable. Abundant accessories including an extender or tube attached between the camera and the lens to convert the magnification or change the optical characteristics are also important as products. A lens portion including such an accessory attached to the lens is called a lens system. The accessory largely influences the chromatic aberration in the lens system.

Hence, for the conventional AF control, a high focus accuracy is required for a high image quality, while AF at the best focus position cannot be obtained because the chromatic aberration is enlarged due to the high magnification.

SUMMARY OF THE INVENTION

It is an object of the present invention to provide an apparatus such as a focus adjustment apparatus capable of appropriately adjusting focusing with respect to chromatic aberration, a control method therefore and a medium for supplying the control program therefor.

In order to achieve the above object, according to the present invention, there is provided an apparatus such as a focus adjustment apparatus comprising a color component signal forming circuit for forming a plurality of color component signals corresponding to predetermined different color components of object light received through an optical system and a focus adjustment signal forming circuit for forming a signal for focus adjustment on the basis of a signal formed by changing a ratio of the plurality of color component signals formed by the color component signal forming circuit.

According to the present invention, there is also provided a focus adjustment method comprising the steps of forming a plurality of color component signals corresponding to predetermined different color components of object light received through an optical system, and forming a signal for focus adjustment on the basis of a signal formed by changing a ratio of the plurality of color component signals formed.

According to the present invention, there is also provided a medium such as a storage medium for supplying a focus adjustment control program, the control program comprising forming a plurality of color component signals corresponding to predetermined different color components of object light received through an optical system, and forming a signal for focus adjustment on the basis of a signal formed by changing a ratio of the plurality of color component signals formed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A-1 to 2C-3 are graphs showing signal characteristics so as to explain the process of setting the mixing ratio of video signals in accordance with chromatic aberration information, in which FIGS. 2A-1 to 2A-3 are graphs showing lens chromatic aberrations in the wide-angle state, middle state, and telephoto state, respectively, FIGS. 2B-1 to 2B-3 are graphs showing AF signal characteristics in the wide-angle state, middle state, and telephoto state, respectively, when the video signal mixing ratio is uniform, and FIGS. 2C-1 to 2C-3 are graphs showing AF signal characteristics in the wide-angle state, middle state, and telephoto state, respectively, when the video signal mixing ratio changes; FIG. 3 is a graph showing the mixing ratio based on the lens chromatic aberration;

FIGS. 6A-1 to 6C-3 are graphs showing signal characteristics when the F-number is F1.8 so as to explain the process of setting the mixing ratio of video signals in accordance with chromatic aberration information, in which FIGS. 6A-1 to 6A-3 are graphs showing lens chromatic aberrations in the wide-angle state, middle state, and telephoto state, respectively, FIGS. 6B-1 to 6B-3 are graphs showing AF signal outputs in the wide-angle state, middle state, and telephoto state, respectively, when the video signal mixing ratio is uniform, and FIGS. 6C-1 to 6C-3 are graphs showing AF signal characteristics in the wide-angle state, middle state, and telephoto state, respectively, when the AF signal mixing ratio changes;

FIGS. 7D-1 to 7E-3 are graphs showing signal characteristics when the F-number is F16 so as to explain the process of setting the mixing ratio of video signals in accordance with chromatic aberration information, in which FIGS. 7D-1 to 7D-3 are graphs showing lens chromatic aberrations in the wide-angle state, middle state, and telephoto state, respectively, and FIGS. 7E-1 to 7E-3 are graphs showing AF signal characteristics in the wide-angle state, middle state, and telephoto state, respectively, when the video signal mixing ratio is uniform;

FIG. 15 shows graphs of signal characteristics so as to explain the process of setting the mixing ratio of video signals in accordance with chromatic aberration information;

FIG. 21 is a flow chart showing the control processing procedure of the eighth embodiment.

DETAILED DESCRIPTION OF THE PREFERRED EMBODIMENTS

The preferred embodiments of the present invention will be described below with reference to the accompanying drawings.

(First Embodiment)

Figure 1:
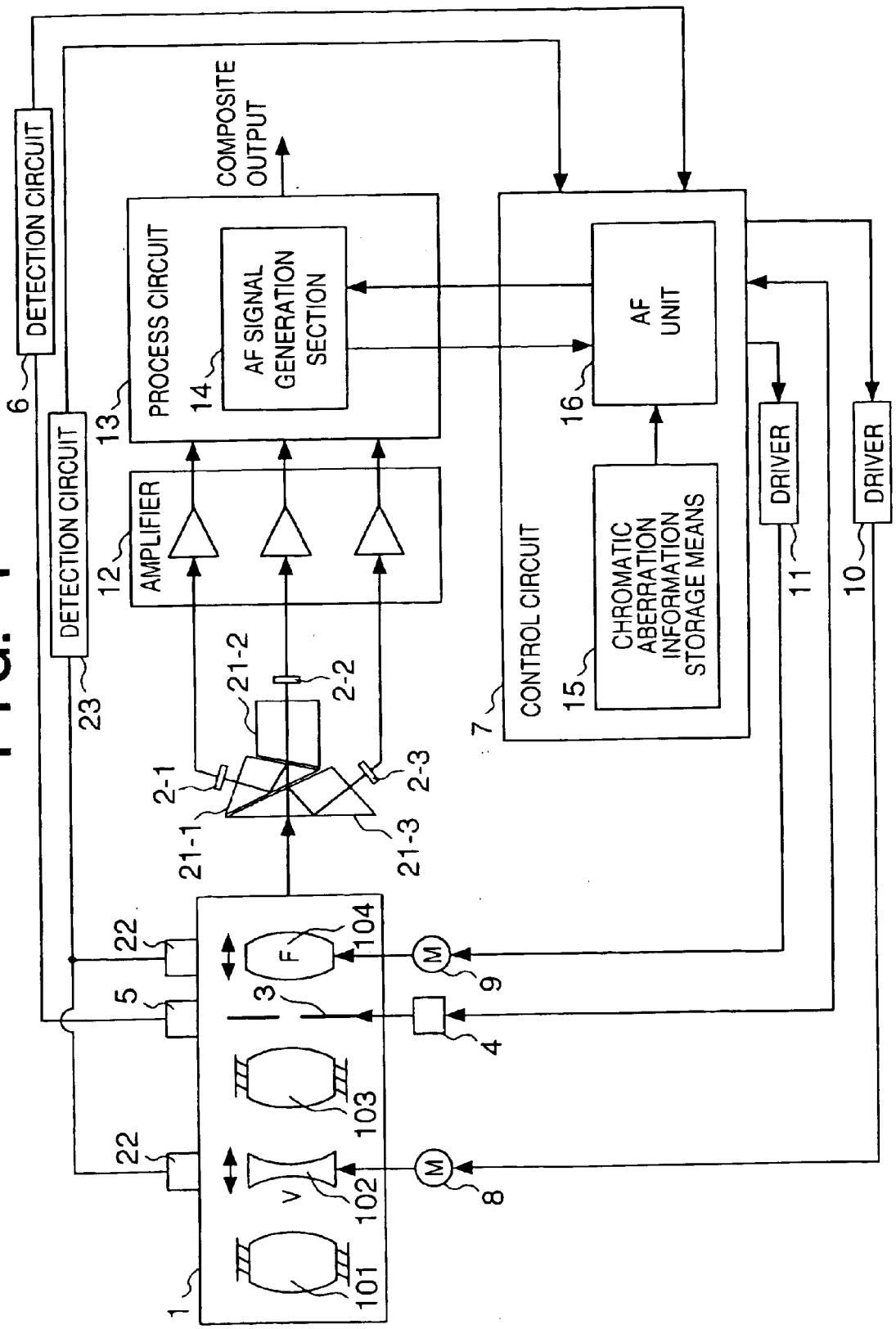
FIG. 1 is a functional block diagram showing an image sensing apparatus according to the first embodiment of the present invention.

FIG. 1 is a block diagram showing the first embodiment of the present invention. Referring to FIG. 1, reference numeral 1 denotes an optical system comprising a rear focus zoom lens (RFZ lens) having four lens groups. The RFZ lens 1 comprises a first lens group (front element) 101 as a fixed lens group, a second lens group (variator) 102 as a movable lens group having a variable magnification function, a third lens group (afocal) 103 as a fixed lens group, and a fourth lens group (RR) 104 as a movable lens group having a focusing function and a function as a compensator for correcting an imaging plane variation due to the variable magnification. Each lens group is actually constructed by a plurality of lenses, though the number of lenses of each lens group is not particularly limited.

The image of a light beam from an object is formed on a photoelectric conversion element as an 6i image sensing means such as a CCD. The photoelectric conversion element comprises image sensing elements 2-1, 2-2, and 2-3 which are located on the monochromatic light emerging surface sides of prisms 21-1, 21-2, and 21-3 as color separation means, respectively. A blue (B) component of the three primary colors is reflected by the blue reflecting dichroic film of the prism 21-3 and forms an image on the image sensing element 2-3. A red (R) component is reflected by the red reflecting dichroic film of the prism 21-1 and forms an image on the image sensing element 2-1. A green (G) component is transmitted through the prisms 21-1, 21-2, and 21-3 and forms an image on the image sensing element 2-2.

An aperture member 3 adjusts the amount of light incident on an photoelectric conversion element 2. An aperture driving unit 4 drives the aperture member 3 under the control of a control circuit 7 such that a predetermined amount of light is incident on the photoelectric conversion element 2. Reference numeral 5 denotes an aperture position detector. An aperture detection circuit 6 detects the output from the aperture position detector 5 and outputs the signal to the control circuit 7. A lens position detector. 22 detects the positions of the second lens group 102 and fourth lens group 104. A lens detection circuit 23 detects the output from the lens position detector 22 and outputs the signal to the control circuit 7.

Lens driving units 8 and 9 such as stepping motors drive the movable lens groups 102 and 104, respectively. Drivers 10 and 11 drive the driving units 8 and 9, respectively.

An amplifier 12 amplifies the output from the photoelectric conversion element 2. A process circuit 13 has a focus signal generation circuit 14 (to be referred to as an AF signal generation circuit 14 hereinafter) for converting a signal as an image sensing signal into a signal such as an NTSC video signal and mixing R, G, and B video outputs at an arbitrary ratio to generate a focus signal (to be referred to as an AF signal hereinafter) for the AF function. A chromatic aberration information storage section 15 constituted by a ROM or the like stores chromatic aberration information of each lens in advance. An AF section 16 constituted by a microcomputer or the like causes the apparatus to perform the AF operation in accordance with the AF signal from the AF signal generation circuit 14 and the output from the chromatic aberration information storage section 15. The chromatic aberration information storage section 15 and AF section 16 are included in the control circuit 7. As the AF scheme, the hill-climbing scheme has been proposed and known, and a detailed description thereof will be omitted.

In the AF operation, the R, G, and B components do not always form images at the best focus position on the same imaging plane because of the chromatic aberrations of lenses and the positions of the image sensing elements 2-1, 2-2, and 2-3.

For a zoom lens, generally, the aberration is small in the wide-angle state, though the aberration becomes large in the telephoto state. In the wide-angle state, optimum AF can be performed using a signal generated from all the R, G, and B video signal components. However, in the telephoto state, the AF operation may not sufficiently function due to the aberration.

In the present invention, the chromatic aberration (MTF) of each lens is prepared as information in advance. In accordance with the chromatic aberration information, the focus position is set mainly in consideration of the G component having the highest visual sensitivity in the video signal, thereby making defocusing due to the chromatic aberration unnoticeable. In addition, all pieces of information of the R, G, and B components are used as much as possible, and the mixing ratio of the R, G, and B video signals is changed in generating an AF signal so as to prevent the focus position in an object, containing only the R or B component from becoming undetectable, thereby always detecting the best peak position without any defocusing.

FIG. 2A-1 shows the shift amounts between the R, G, and B components on the imaging plane due to chromatic aberrations in the wide-angle state. In this case, the shifts between the R, G, and B components are small. Hence, as shown in FIG. 2B-1, even when the ratio of the R, G, and B components of the AF signal is 1:1:1, only one peak position is obviously present. However, since the R, G, and B components do not completely match, the gradient of the output peak of the AF signal is almost flat, and the actual peak position can hardly be detected by the AF operation. As shown in FIG. 2C-1, when the mixing ratio of the R, G, and B components is set to G:B:R=1:0.9:0.8, the peak can easily be detected. Detailed examples of numerical values of the R, G, and B mixing ratio to be described below are merely examples for a descriptive convenience and are not limited to those values.

FIG. 2A-2 shows a state wherein the R, G, and B components do not form images at the best peak position on the same plane and are separated from each other due to the chromatic aberrations in the middle region. As shown in FIG. 2B-2, if the R, G, and B mixing ratio is G:R:B=1:1:1, two peaks as AF signals are present at two points: a point near the G and B components and a point corresponding to the R component, and the AF operation may stop at one of the peak positions. Generally, a video signal contains the G component at a high ratio, so the G peak position is close to the best focus position for the human eye. Hence, the more the position where the AF operation stops is separated from the G component, the larger the defocus state becomes.

Figure 3:
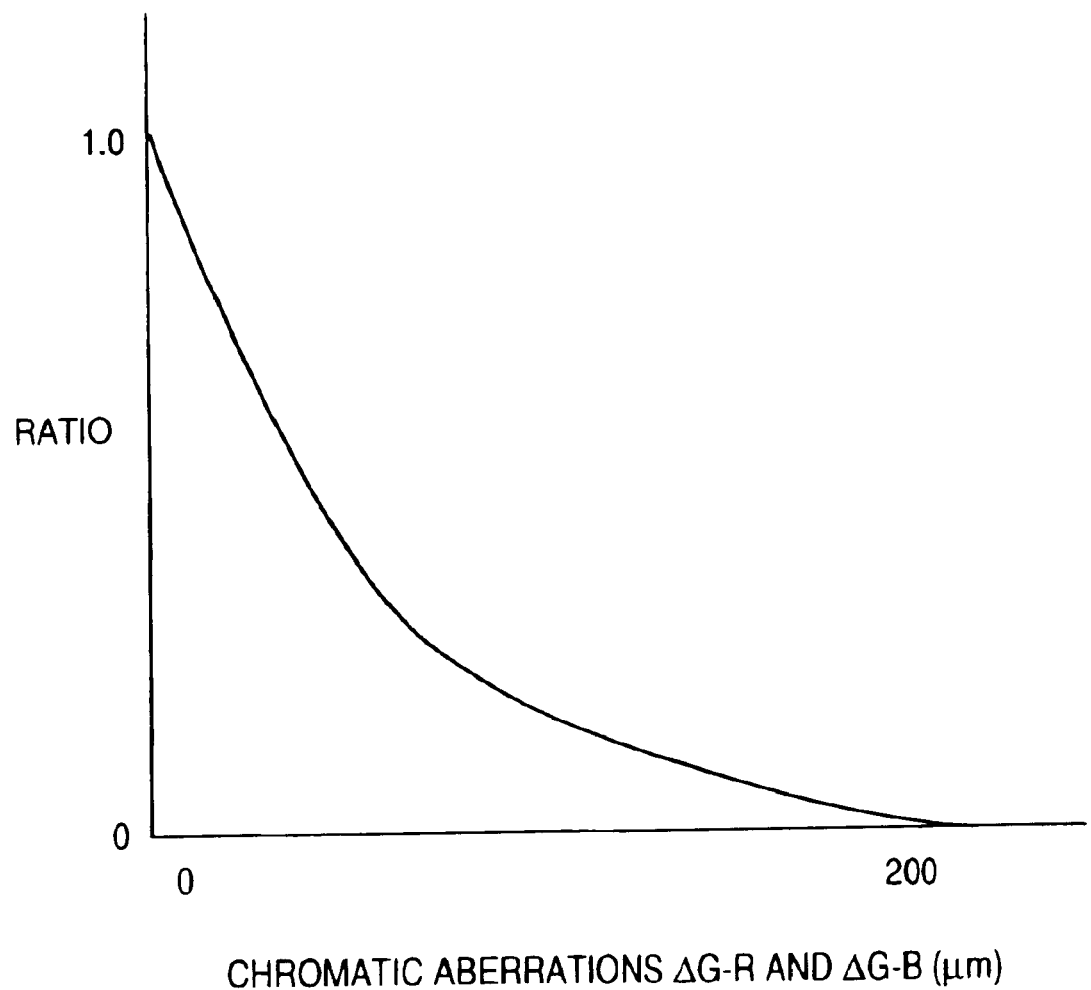

As shown in FIG. 2C-2, when the mixing ratio of the R, G, and B components is set to G:B:R=1:1:0.3, the peaks can converge to one point, so the focus position can be detected on the basis of the signal component which is contained in the video signal at a high ratio. When the signal component ratio in the video signal is known in advance, it can be determined which color component signal is to be used as a major component for AF signal generation. FIG. 2A-3 shows a state wherein no best peak position is obtained. on one imaging plane because of the chromatic aberrations in the telephoto region. AF signal peaks based on the R, G, and B video signal components are present on different imaging planes. As shown in FIG. 2B-3, if the mixing ratio of the R, G, and B components is G:B:R=1:1:1, peaks as AF signals are present at the R, G, and B positions, and the AF operation may stop at one of the peak positions.

As shown in FIG. 2C-3, when the mixing ratio is set to G:B:R=1:0.5:0.1, the peaks can converge to one point, so the focus position can be detected on the basis of the signal component which is contained in the video signal at a high ratio.

FIG. 3 is a graph showing a detailed example of a change in mixing ratio on the basis of the magnitudes of positional shifts of the R and B components with respect to the G component due to chromatic aberrations.

For example, if the ratio of the G component is 1.0, ratios are obtained from an aberration $\Delta$G-R between the G and R components and an aberration $\Delta$G-B between the G and B components, and the ratio G:R:B is set to 1:1:1 or 1:0:0. These ratios may be prepared as a table in the control circuit 7 or calculated. The detailed numerical values are not limited to those described above, and the values may be externally rewritten.

For a zoom lens (RFZ lens 102), the chromatic aberration changes depending on the zoom position. For this reason, when chromatic aberrations corresponding to the zoom positions are stored in the chromatic aberration information storage section 15 in advance, the AF operation can be performed at an appropriate mixing ratio G:R:B for any zoom position.

Figure 4:
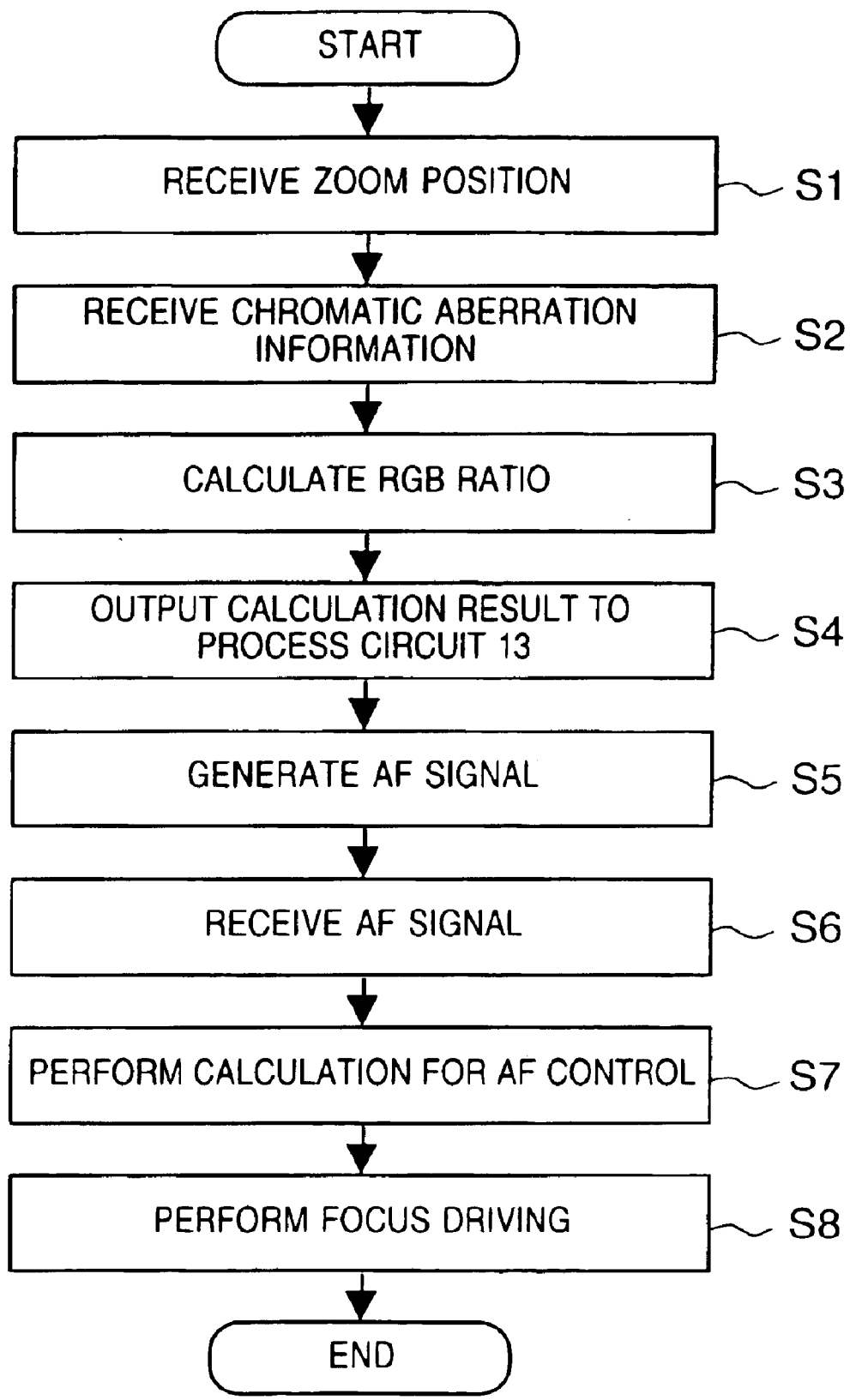
FIG. 4 is a flow chart showing the control processing procedure of the first embodiment.

The control processing procedure of the first embodiment will be described with reference to the flow chart shown in FIG. 4. In step S1, the control circuit 7 receives lens position information of the RFZ lens 102 and the like from the lens position detection circuit 23. In step S2 (to be simply referred to as S2 hereinafter), the control circuit 7 receives pieces of chromatic aberration information corresponding to the pieces of lens position information read in S1 from the chromatic aberration information storage section 15. In S3, the control circuit 7 calculates the AF generation ratio of the R, G, and B components. In S4, the calculation result obtained in S3 is output to the process circuit 13. In S5, the AF signal generation circuit 14 generates an AF signal from the calculation result. In S6, the control circuit 7 causes the AF section 16 to receive the output from the process circuit 13. In S7, the AF section 16 executes calculation for predetermined AF control. In S8, the AF section 16 performs focus driving on the basis of the calculation result obtained in S7.

(Second Embodiment)

The second embodiment will be described next with reference to FIG. 5.

The second embodiment is almost the same as the first embodiment. The same reference numerals as in the first embodiment denote the same members in the second embodiment, and a detailed description thereof will be omitted. The second embodiment is different from the first embodiment in that aperture information obtained by an aperture detection circuit 6 is added (portion 17) to chromatic aberration information from a chromatic aberration information storage section 15. Referring to FIG. 5, the control circuit 7 receives the output from the aperture detection circuit 6, adds the output value to the chromatic aberration information, and changes the mixing ratio of R, G, and B components.

Figure 7:
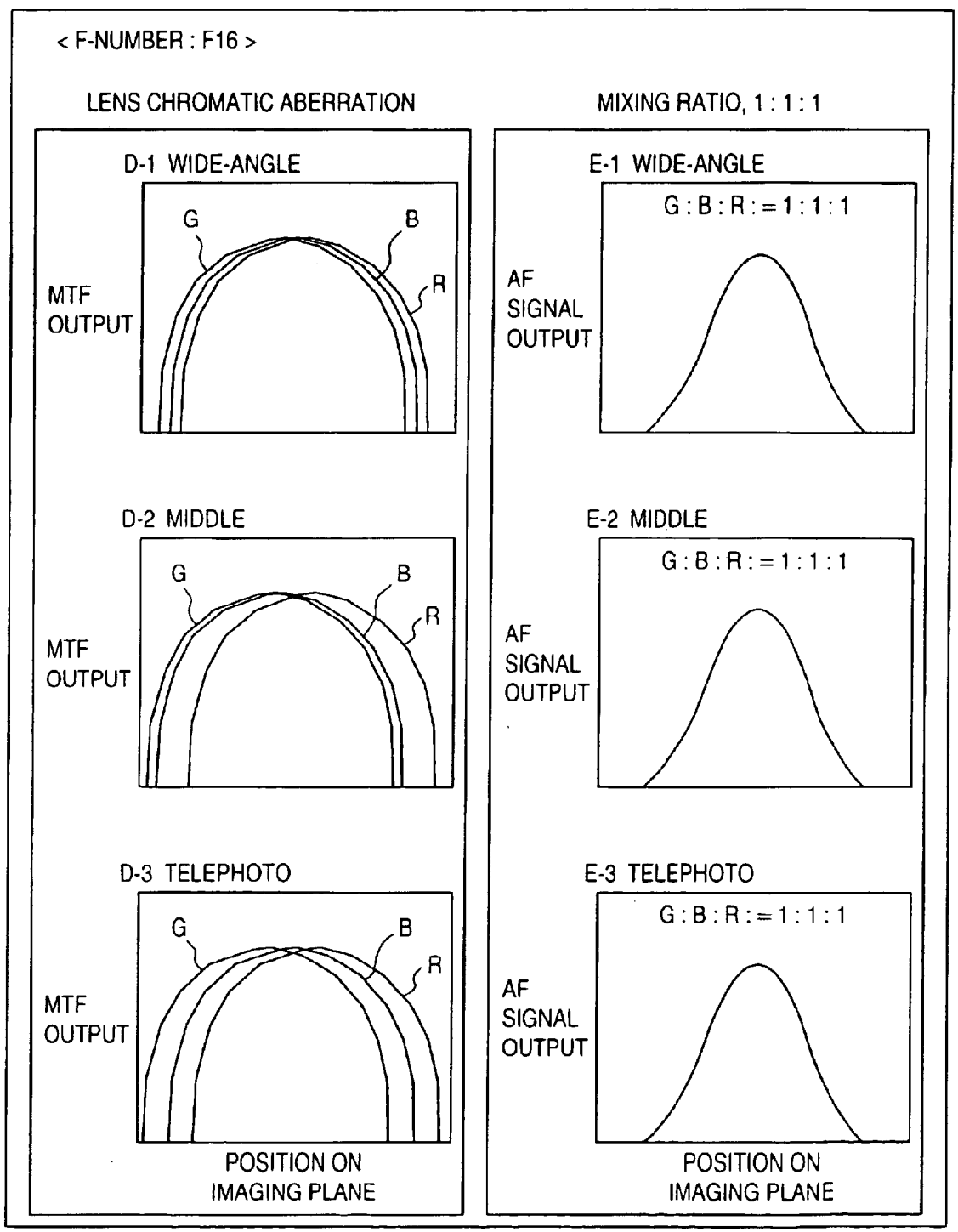

FIG. 6 shows an example in which the F-number from the aperture detection circuit 6 is F1.8 representing a full-aperture state. FIG. 7 shows an example of a stopped-down-aperture state having an F-number, of F16.

FIG. 6A-1 shows the shift amounts between the R, G, and B components on the imaging plane due to chromatic aberrations in the wide-angle state at an F-number of F1.8. In this case, the shifts between the R, G, and B components are small. Hence, as shown in FIG. 6B-1, even when the ratio of the R, G, and B components of the AF signal is 1:1:1, only one peak position is obviously present. However, since the R, G, and B components do not completely match, the gradient of the output peak of the AF signal is almost flat, and the actual peak position can hardly be detected by the AF operation. As shown in FIG. 6C-1, when the mixing ratio of the R, G, and B components is set to G:B:R=1:0.9:0.8, the peak can easily be detected.

FIG. 6A-2 shows a state wherein the R, G, and B components do not form images at the best peak position on the same plane in the middle region at an F-number of F1.8, the G and B components are close to each other, and the R component is separated. As shown in FIG. 6B-2, if the ratio of components is G:B:R=1:1:1, two peaks as AF signals are present at two points: a point near the G and B components and a point corresponding to the R component, and the AF operation may stop at one of the peak positions. Generally, a video signal contains the G component at a high ratio, so the G peak position is close to the best focus position for the human eye. Hence, the farther the position where the AF operation stops is separated from the G component, the larger the defocus state becomes. As shown in FIG. 6C-2, when the mixing ratio of the R, G, and B components is set to 1:1:0.3, the peaks can converge to one point, so the focus position can be detected on the basis of the signal component which is contained in the video signal at a high ratio. When the signal component ratio in the video signal is known in advance, it can be determined which color component signal is to be used as a major component for AF signal generation.

FIG. 6A-3 shows a state wherein no best peak position is obtained on one imaging plane because of the chromatic aberrations in the telephoto region at an F-number of F1.8. AF signal peaks based on the R, G, and B video signal components are present on different imaging planes. As shown in FIG. 6B-3, if the mixing ratio of the components is 1:1:1, peaks as AF signals are present at the R, G, and B positions, and the AF operation may stop at one of the peak positions. As shown in FIG. 6C-3, when the mixing ratio is set to 1:0.5:0.1, the peaks can converge to one point, so the focus position can be detected on the basis of the signal component which is contained in the video signal at a high ratio.

When the F-number is F16, as shown in FIG. 7, the depth is larger than for F1.8 in all of the wide-angle state shown in FIG. 7D-1, middle state shown in FIG. 7D-2, and telephoto state shown in FIG. 7D-3. Even when the mixing ratio of the R, G, and B components are set to 1:1:1, as shown in FIGS. 7E-1, 7E-2, and 7E-3, to cover the aberrations between the R, G, and B components, one peak is output. Hence, this ratio is preferable for the AF signal.

As shown in FIGS. 6 and 7, when the full-aperture state is almost set (small F-number), the mixing ratio of the R, G, and B components is appropriately changed from 1:1:1 on the basis of the chromatic aberration information. As the stopped-down-aperture state is set (F-number becomes large), the mixing ratio is made close to 1:1:1. Thus, by changing the mixing ratio in accordance with the F-number, an optimum AF signal is generated.

Figure 8:
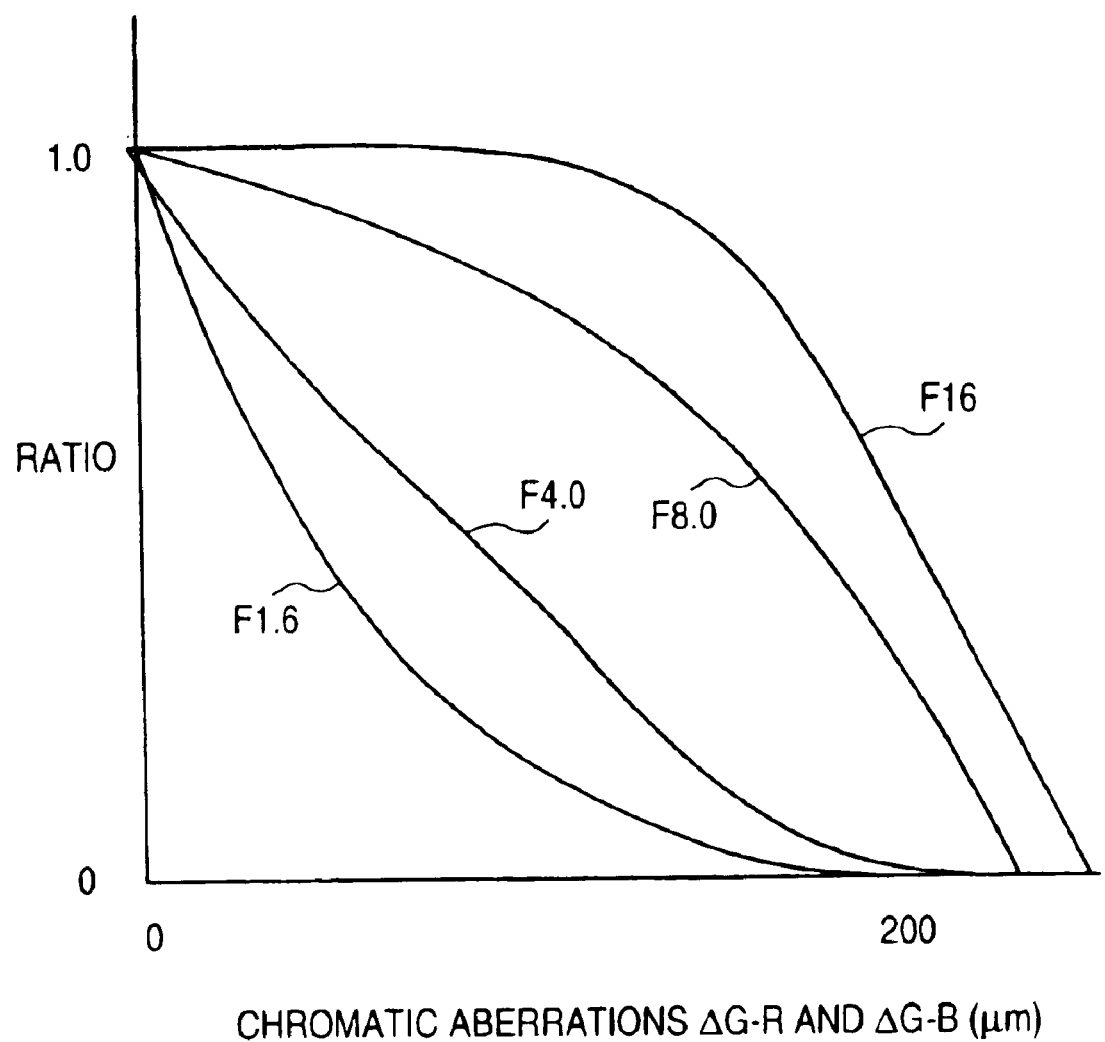
FIG. 8 is a graph showing the mixing ratio based on the lens chromatic aberration and F-number.

FIG. 8 is a graph showing a detailed example of a change in ratio on the basis of the magnitudes of positional shifts of the R and B components with respect to the G component due to chromatic aberrations and F-number.

As is apparent from FIG. 8, when it is assumed that the ratio of the G component is 1.0, and the F-number is small, ratios are set low, or when the F-number is large, ratios are set close to 1.0 even when the aberrations are equal in obtaining the ratios from an aberration ΔG-R between the G and R components and an aberration ΔG-B between the G and B components. These ratios may be prepared as a table in a control circuit 7 or calculated. The detailed numerical values are not limited to those described above, and the values may be externally rewritten.

Figure 9:
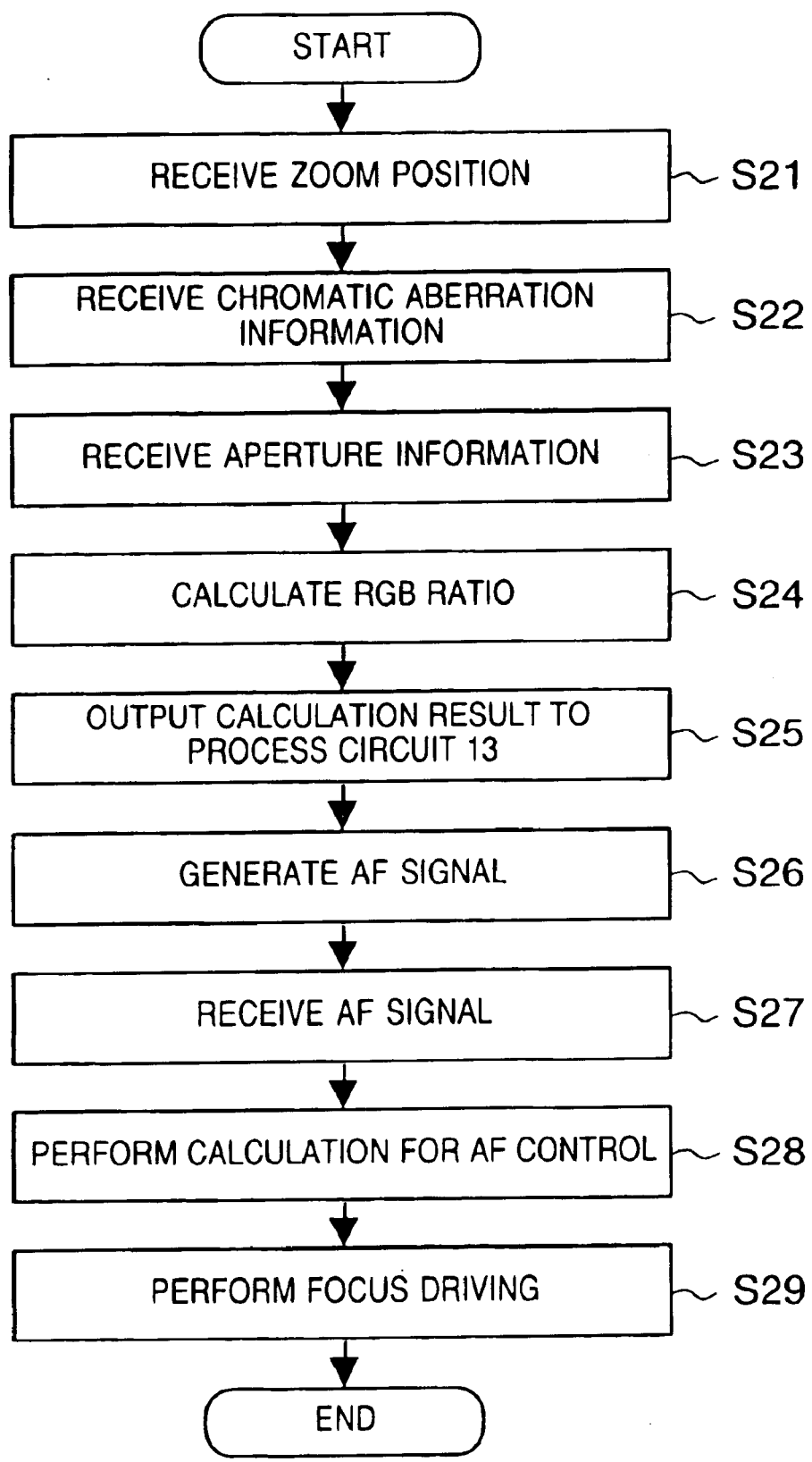
FIG. 9 is a flow chart showing the control processing procedure of the second embodiment.

The control processing procedure of the second embodiment will be described with reference to the flow chart shown in FIG. 9. In S21, the control circuit 7 receives lens position information of an RFZ lens 102 and the like from a lens position detection circuit 23. In S22, the control circuit 7 receives pieces of chromatic aberration information corresponding to the pieces of lens position information read in S1 from the, chromatic aberration information storage section 15. In S23, the control circuit 7 receives the F-number from the aperture detection circuit 6. In S24, the control circuit 7 calculates the AF generation ratio of the R, G, and B components in consideration of the F-number. In S25, the calculation result obtained in S24 is output to a process circuit 13. In S26, an AF signal generation circuit 14 generates an AF signal from the calculation result. In S27, the control circuit 7 causes an AF section 16 to receive the output from the process circuit 13. In S28, the AF section 16 executes calculation for predetermined AF control. In S29, the AF section 16 performs focus driving on the basis of the calculation result obtained in S28.

(Third Embodiment)

Figure 10:
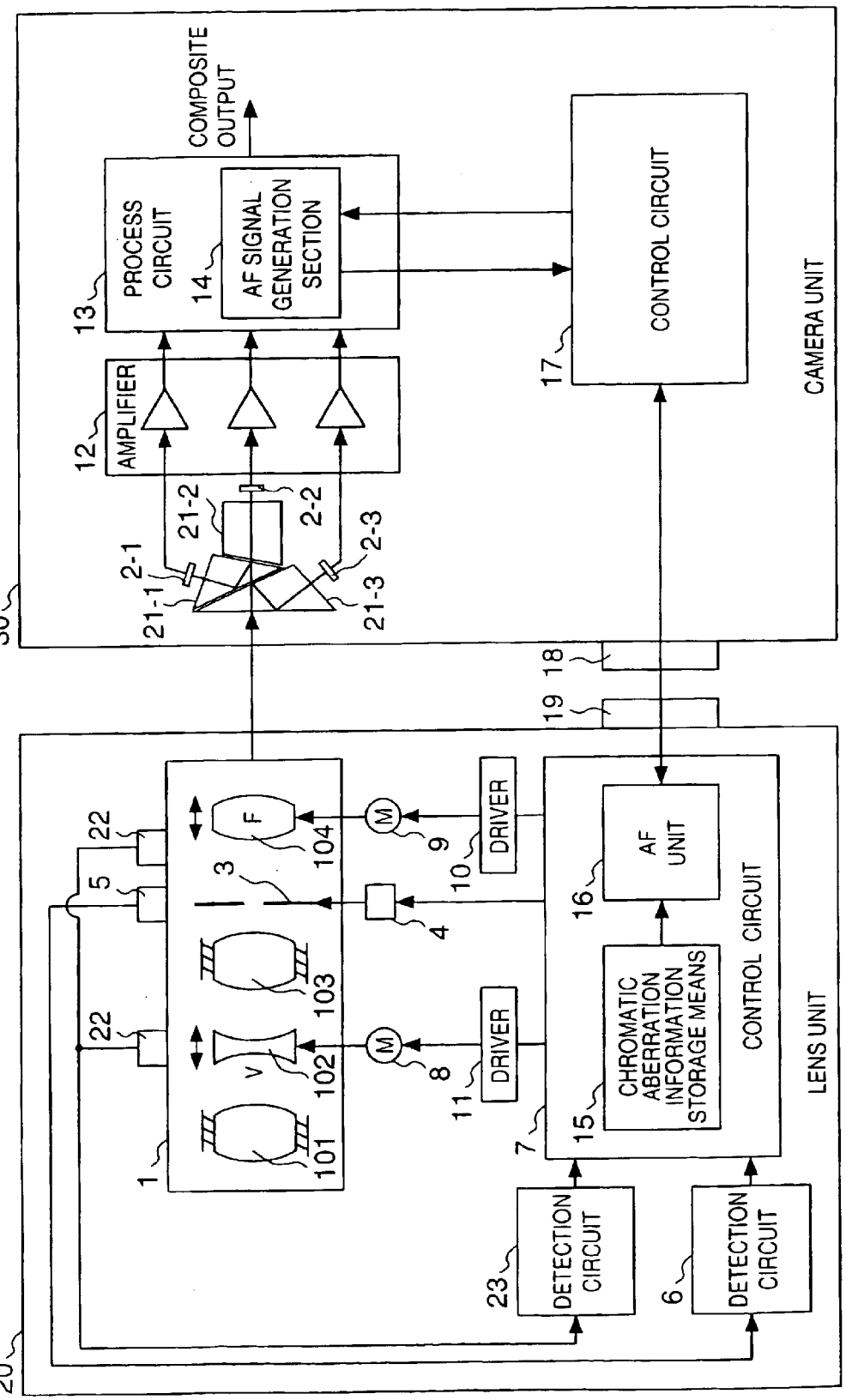
FIG. 10 is a functional block diagram showing an image sensing apparatus according to the third embodiment of the present invention.

The third embodiment will be described next with reference to FIG. 10.

The third embodiment is almost the same as the first embodiment. The same reference numerals as in the first embodiment denote the same members in the third embodiment, and a detailed description thereof will be omitted. The third embodiment is different from the first embodiment in that the lens system uses an interchangeable lens, and chromatic aberration information of a zoom lens (RFZ lens 102 or the like) is transmitted from a lens unit 20 to a camera unit 30. A second control circuit 17 of the camera unit 30 transmits the output from a process circuit 13 for generating a focus signal for the AF operation and the output for the aperture operation to a first control circuit 7 of the lens unit 20 through a camera contact 18 and lens contact 19. The first control circuit 7 performs the AF or aperture operation on the basis of the information and transmits the zoom position, focus position, and aperture position to the second control circuit 17. Thus, the first control circuit 7 and second control circuit 17 transmit/receive information.

Figure 11:
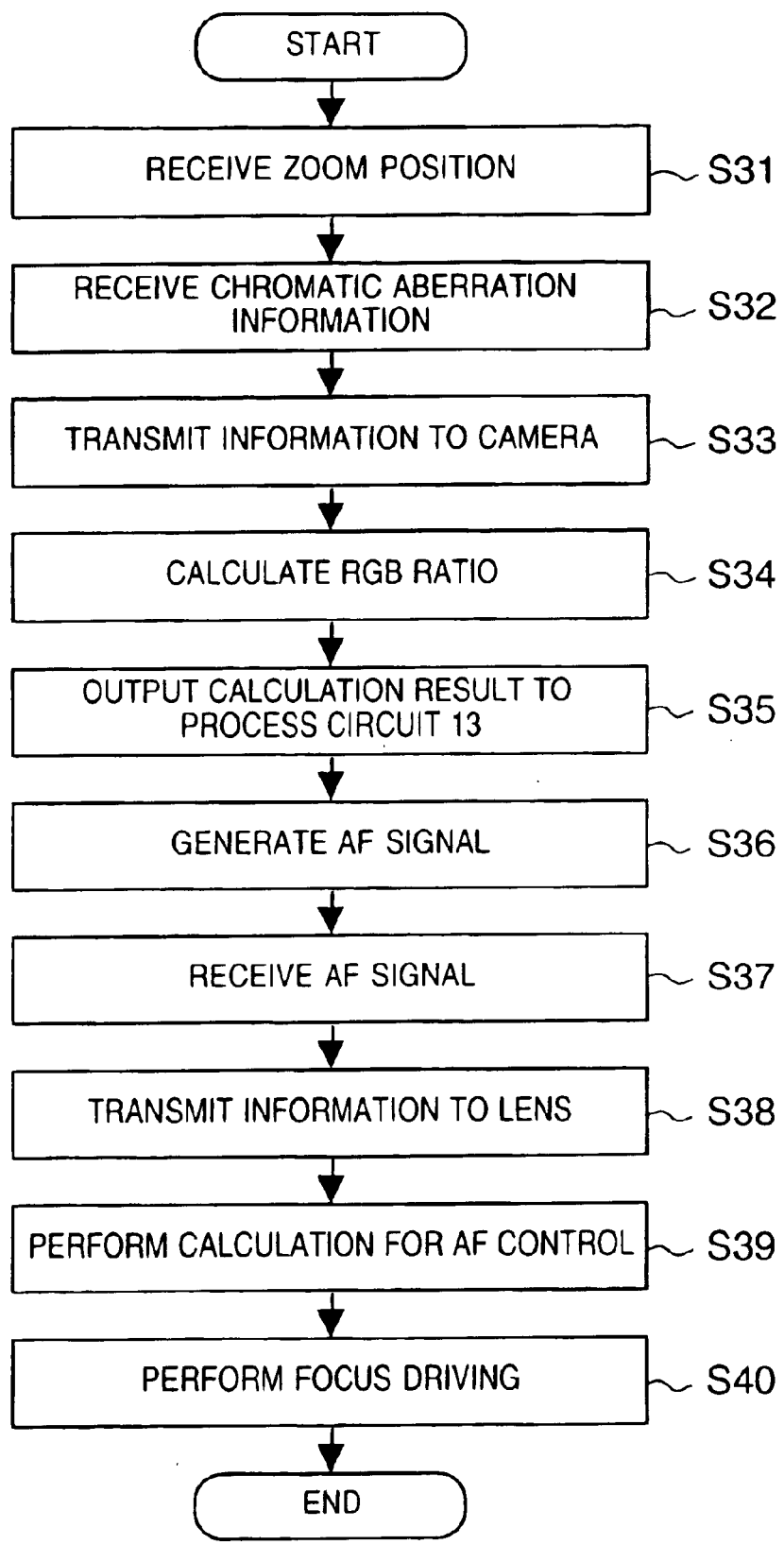
FIG. 11 is a flow chart showing the control processing procedure of the third embodiment.

The control processing procedure of the third embodiment will be described with reference to FIG. 10 and the flow chart shown in FIG. 11.

In S31, the first control circuit 7 receives lens position information of the RFZ lens 102 and the like from a lens position detection circuit 23. In S32, the control circuit 7 receives pieces of chromatic aberration information corresponding to the pieces of lens position information read in S31 from a chromatic aberration information storage section 15. In S33, the first control circuit 7 transmits the received chromatic aberration information to the camera unit 30. In S34, the second control circuit 17 calculates the AF generation ratio of the R, G, and B components on the basis of the received chromatic aberration information. In S35, the calculation result obtained in S34 is output to the process circuit 13. In S36, an AF signal generation circuit 14 generates an AF signal from the calculation result. In S37, the second control circuit 17 receives the output from the process circuit 13. In S38, the received AF signal is transmitted to an AF section 16 of the lens unit 20. In S39, the AF section 16 executes calculation for predetermined AF control. In S40, the AF section 16 performs focus driving on the basis of the calculation result obtained in S39.

As a conspicuous characteristic feature of this embodiment, the chromatic aberration information can be used not only for the AF operation but also for various other application purposes.

(Fourth Embodiment)

The fourth embodiment will be described next with reference to FIG. 10.

The fourth embodiment is almost the same as the third embodiment. The same reference numerals as in the third embodiment denote the same members in the fourth embodiment, and a detailed description thereof will be omitted. The fourth embodiment is different from the third embodiment in that aperture information of a zoom lens (RFZ lens 102) and the like are transmitted from a lens unit 20 to a camera unit 30, aperture information of the lens is also transmitted, and the mixing ratio of R, G, and B components of an AF signal is calculated on the camera unit 30 side on the basis of the chromatic aberration information and F-number.

Figure 12:
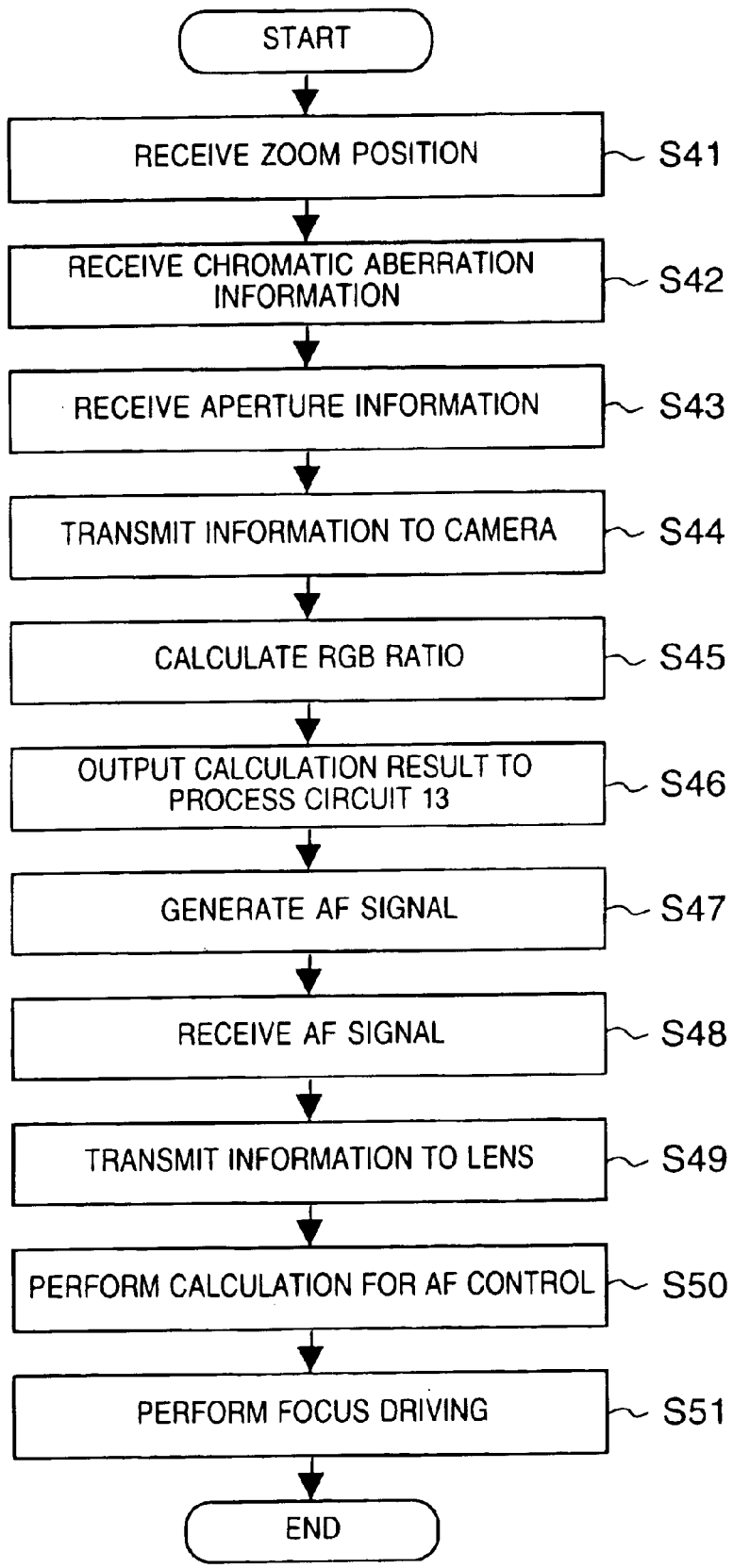
FIG. 12 is a flow chart showing the control processing procedure of the fourth embodiment.

The control processing procedure of the fourth embodiment will be described with reference to FIG. 10 and the flow chart shown in FIG. 12.

In S41, a first control circuit 7 receives lens position information of the RFZ lens 102 and the like from a lens position detection circuit 23. In S42, the control circuit 7 receives pieces of chromatic aberration information corresponding to the pieces of lens position information read in S41 from a chromatic aberration information storage section 15. In S43, the first control circuit 7 receives aperture information from an aperture detection circuit 6. In S44, the first control circuit 7 transmits the received chromatic aberration information and aperture information to the camera unit 30. In S45, a second control circuit 17 calculates the AF generation ratio of the R, G, and B components on the basis of the received chromatic aberration information in consideration of the aperture information. In S46, the second control circuit 17 outputs the calculation result obtained in S45 to a process circuit 13. In S47, an AF signal generation circuit 14 generates an AF signal from the calculation result. In S48, the second control circuit 17 receives the AF signal output from the process circuit 13. In S49, the received AF signal is transmitted to an AF section .16 of the lens unit 20. In S50, the AF section 16 executes calculation for predetermined AF control. In S51, the AF section 16 performs focus driving on the basis of the calculation result obtained in S50.

(Fifth Embodiment)

The fifth embodiment will be described next with reference to FIG. 10.

The fifth embodiment is almost the same as the third embodiment. The same reference numerals as in the third embodiment denote the same members in the fifth embodiment, and a detailed description thereof will be omitted. The fifth embodiment is different from the third embodiment in that the mixing ratio of R, G, and B components for AF signal generation is calculated on the basis of optical information such as chromatic aberration information of a zoom lens (RFZ lens 102) and the like and aperture information, the calculation result is transmitted to a camera unit 30, and the AF signal is generated on the camera unit 30 side.

Figure 13:
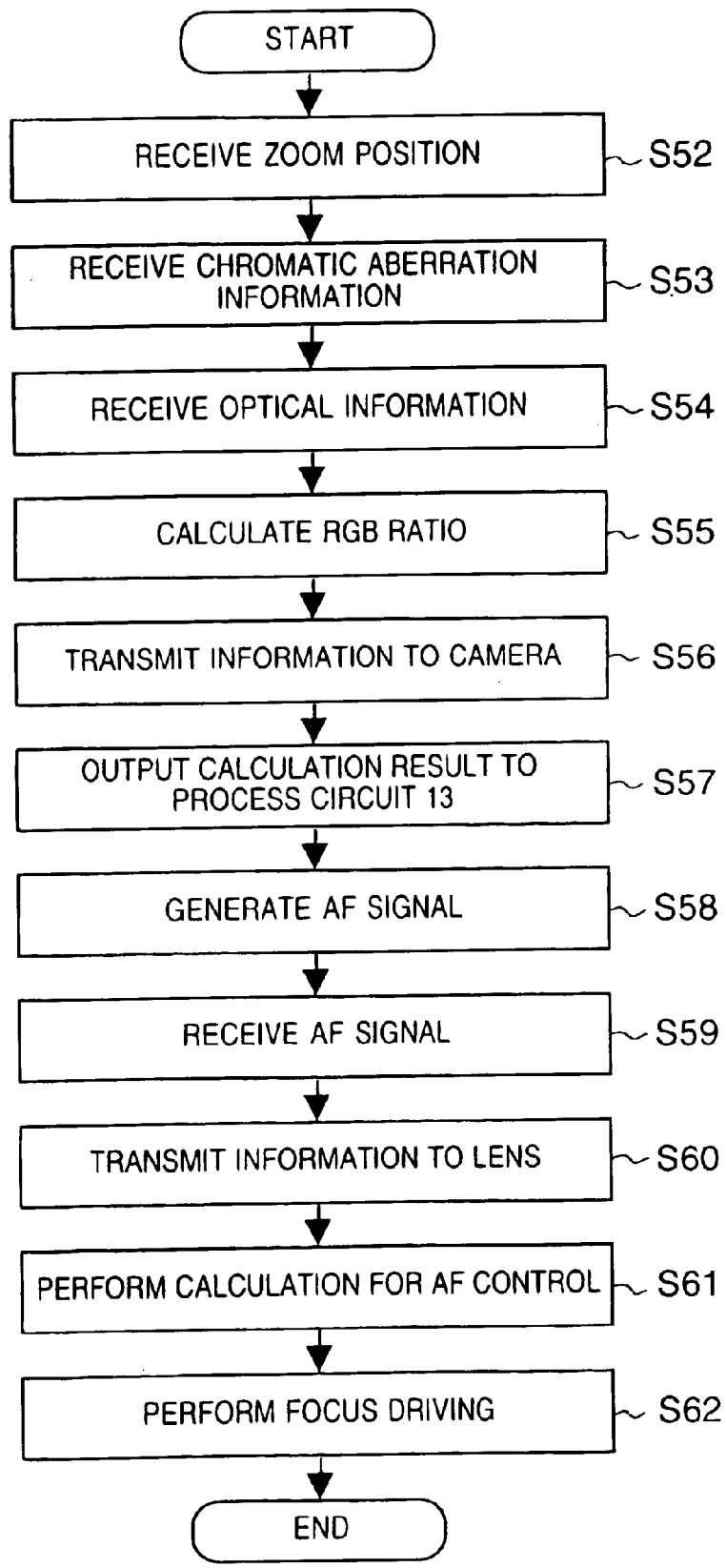
FIG. 13 is a flow chart showing the control processing procedure of the fifth embodiment.

The control processing procedure of the fifth embodiment will be described with reference to FIG. 10 and the flow chart shown in FIG. 13.

In S52, a first control circuit 7 receives lens position information of the RFZ lens 102 and the like from a lens position detection circuit 23. In S53, the control circuit 7 receives pieces of chromatic aberration information corresponding to the pieces of lens position information read in S53 from a chromatic aberration information storage section 15. In S54, the first control circuit 7 receives optical information such as aperture information from an aperture detection circuit 6. In S55, the first control circuit 7 calculates the AF generation ratio of R, G, and B components on the basis of the received chromatic aberration information and optical information. In S56, the calculation result is transmitted to the camera unit 30. In S57, a second control circuit 17 outputs the received calculation result to a process circuit 13. In S58, an AF signal generation circuit 14 generates an AF signal from the calculation result. In S59, the second control circuit 17 receives the AF signal output from the process circuit 13. In S60, the received AF signal is transmitted to an AF section 16 of a lens unit 20. In S61, the AF section 16 executes calculation for predetermined AF control. In S62, the AF section 16 performs focus driving on the basis of the calculation result obtained in S61.

(Sixth Embodiment)

Figure 14:
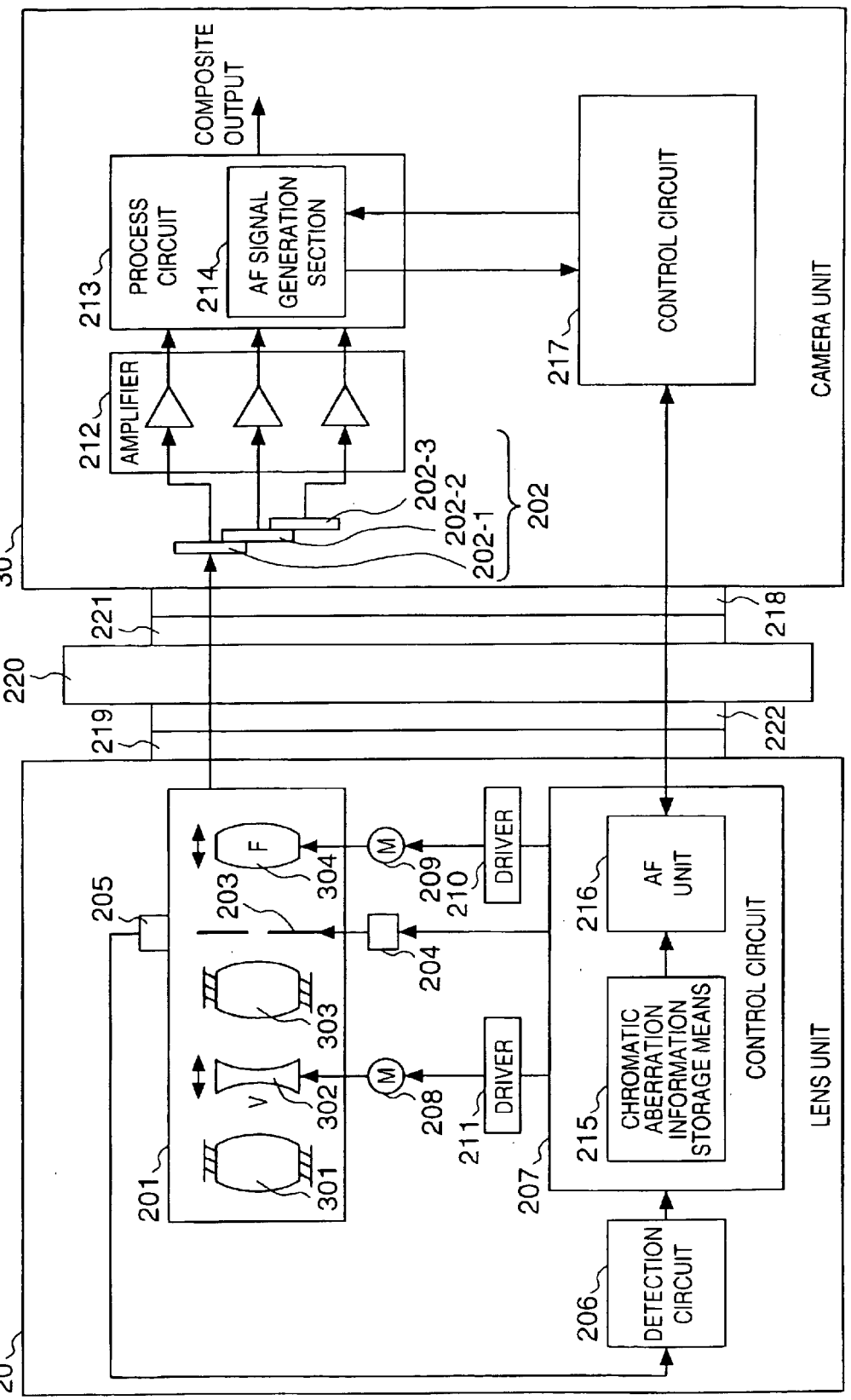
FIG. 14 is a functional block diagram showing an image sensing apparatus according to the sixth embodiment of the present invention.

FIG. 14 is a block diagram showing the sixth embodiment.

A camera unit control circuit 217 of a camera unit transmits the output from a process circuit 213 for generating a focus signal for AF and the output for the aperture operation to a lens unit control circuit 207 through a camera contact 218 and adapter camera side contact 221, and an adapter lens side contact 222 and a lens contact 219. An adapter 220 has a contact for identifying the pieces of information at the adapter lens side contact 222. The adapter 220 includes an identification circuit 223. The lens unit control circuit 207 identifies the presence/absence of the adapter and the type of adapter through the lens contact 219. The lens unit control circuit 207 performs the AF or aperture operation on the basis of these pieces of information and sends the zoom position, focus position, and aperture position to the camera unit control circuit by communication. Thus, the control circuits of the camera unit and lens unit can transmit/receive information.

Referring to FIG. 14, reference numeral 201 denotes an optical system comprising a rear focus zoom lens (RFZ lens) having four lens groups. The RFZ lens 201 comprises a first lens group (to be referred to as a front element hereinafter) 301 as a fixed lens group, a second lens group (to be referred to as a variator hereinafter) 302 as a movable lens group having a variable magnification function, a third lens group (to be referred to as an afocal hereinafter) 303 as a fixed lens group, and a fourth lens group (to be referred to as an RR hereinafter) 304 as a movable lens group having a focusing function and a function as a compensator for correcting an imaging plane variation due to the variable magnification.

Each lens group is actually constructed by a plurality of lenses, though the number of lenses of each lens group is not particularly limited. In addition, the adapter 220 is not particularly limited, and it may have or omit an optical system for, e.g., increasing the zoom magnification, an optical system for obtaining a closeup object sensing effect, a means for converting data without using any optical system by directly passing a light beam, or a flange-back adapter.

The image of a red (R) component of the three primary colors of a light beam from an object is formed on an image sensing element 202-1 such as a CCD, the image of a green (G) component is formed on an image sensing element 202-2 such as a CCD, and the image of a blue (B) component is formed on an image sensing element 202-3 such as a CCD.

An aperture member 203 adjusts the amount of light incident on an photoelectric conversion element 202. An aperture driving unit 204 drives the aperture member 203 under the control of the control circuit 207 such that a predetermined amount of light is incident on the photoelectric conversion element 202. Reference numeral 205 denotes an aperture position detector. A detection circuit 206 detects the output from the aperture position detector 205 and outputs the signal to the control circuit 207.

Driving units 208 and 209 such as stepping motors drive the movable lens groups 302 and 304, respectively. Drivers 210 and 211 drive the driving units 208 and 209, respectively.

An amplifier 212 amplifies the output from the photoelectric conversion element 202. A process circuit 213 has an automatic focusing (to be referred to as AF hereinafter) signal generation circuit 14 for converting a signal into a signal such as an NTSC video signal and mixing R, G, and B video outputs at an arbitrary ratio to generate an AF signal for the AF operation. A storage means 215 stores chromatic aberration information of each lens in advance. When the adapter 220 is attached, the storage means 215 may have chromatic information including information of the adapter 220. Alternatively, when the adapter is attached, the chromatic aberration information may be calculated in the lens unit control circuit 207 on the basis of the information from the lens chromatic information storage means and the presence/absence of the adapter. An AF section 216 causes the apparatus to perform the AF operation in accordance with the AF signal from the AF signal generation circuit 214 and the output from the chromatic aberration information storage means 215. The AF scheme is known, as described above, and a detailed description thereof will be omitted.

In this embodiment, chromatic aberration of a lens is prepared as information in advance, and even when the adapter is attached, the mixing ratio of the R, G, and B components is actively changed in generating an AF signal in accordance with the chromatic aberration information including information of the adapter, thereby implementing AF capable of always detecting the best peak position without any blur.

This will be described with reference to FIG. 15.

FIG. 15A-1 shows the shift amounts between the R, G, and B components on the imaging plane in the wide-angle state.

In this case, the shifts between the R, G, and B components are small. Hence, even when the ratio of the R, G, and B components of the AF signal is G:B R=1:1:1, only one peak position is obviously present. However, since the R, G, and B components do. not completely match, the gradient of the output peak of the AF signal is almost flat, as shown in FIG. 15B-1, and the actual peak position can-hardly be detected by the AF operation. As shown in FIG. 15C-1, when the mixing ratio of the R, G, and B components is set to G:B:R=1:0.9:0.8, the peak can easily be detected. Detailed examples of numerical values of the R, G, and B mixing ratio to be described below are merely examples for a descriptive convenience and are not limited to those values. FIG. 15A-2 shows a state wherein the R, G, and B components do not form images at the best peak position on the same plane, the R and B components are close to each other, and the G component is separated If the mixing ratio of the R, G, and B signal components is 1:1:1, two peaks as AF signals are present at two points: a point near the R and B components and a point corresponding to the G component, and the AF operation can stop at any peak position.

Generally, a video signal contains the G component at a high ratio, so the G peak position is close to the best focus position for the human eye. Hence, the farther the position where the AF operation stops is separated from the G component, the larger the defocus state becomes.

As shown in FIG. 15C-2, when the mixing ratio is set to G:B:R=1:1:0.3, the peaks can converge to one point, so the focus position can be detected on the basis of the signal component which is contained in the video signal at a high ratio. When the signal component ratio in the video signal is known in advance, it can be determined which color component signal is to be used as a major component for AF signal generation.

FIG. 15A-3 shows a state wherein no best peak position is obtained on one imaging plane because of the chromatic aberrations in the telephoto region. AF signal peaks based on the R, G, and B video signal components are present on different imaging planes.

If the ratio is 1:1:1, peaks as AF signals are present at the R, G, and B positions, and the AF operation can stop at any peak position.

As shown in FIG. 15C-3, when the mixing ratio is set to G:B:R=1:0.5:0.1, the peaks can converge to one point, so the focus position can be detected on the basis of the signal component which is contained in the video signal at a high ratio.

Figure 16:
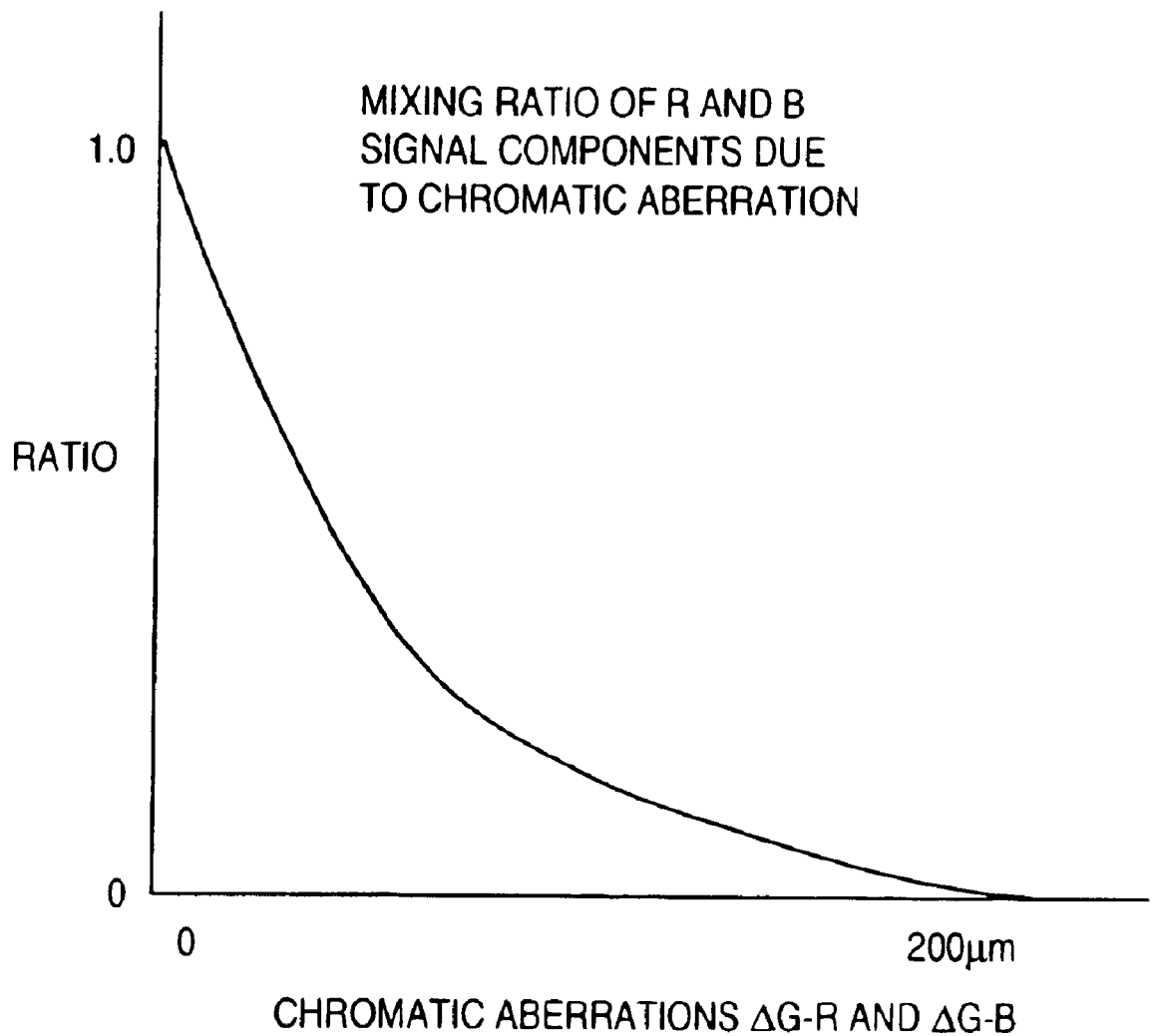
FIG. 16 is a graph showing the mixing ratio based on the lens chromatic aberration.

FIG. 16 is a graph showing a detailed example of a change in mixing ratio on the basis of the magnitudes of positional shifts of the R and B components with respect to the G component.

For example, if the ratio of the G component is 1.0, ratios are obtained from an aberration $\Delta$G-R between the G and R components and an aberration $\Delta$G-B between the G and B components, and the ratio G:B:R is set to 1:1:1 or 1:0.0:0.0. These ratios may be prepared as a table in the control circuit or calculated. The detailed numerical values are not limited to those described above, and the values may be externally rewritten.

For a zoom lens, the chromatic aberration changes depending on the zoom position. For this reason, when chromatic aberrations corresponding to the zoom positions are stored in advance, and pieces of chromatic aberration information corresponding to the zoom positions are stored, the AF operation can be performed at an appropriate mixing ratio for any zoom position.

Figure 17:
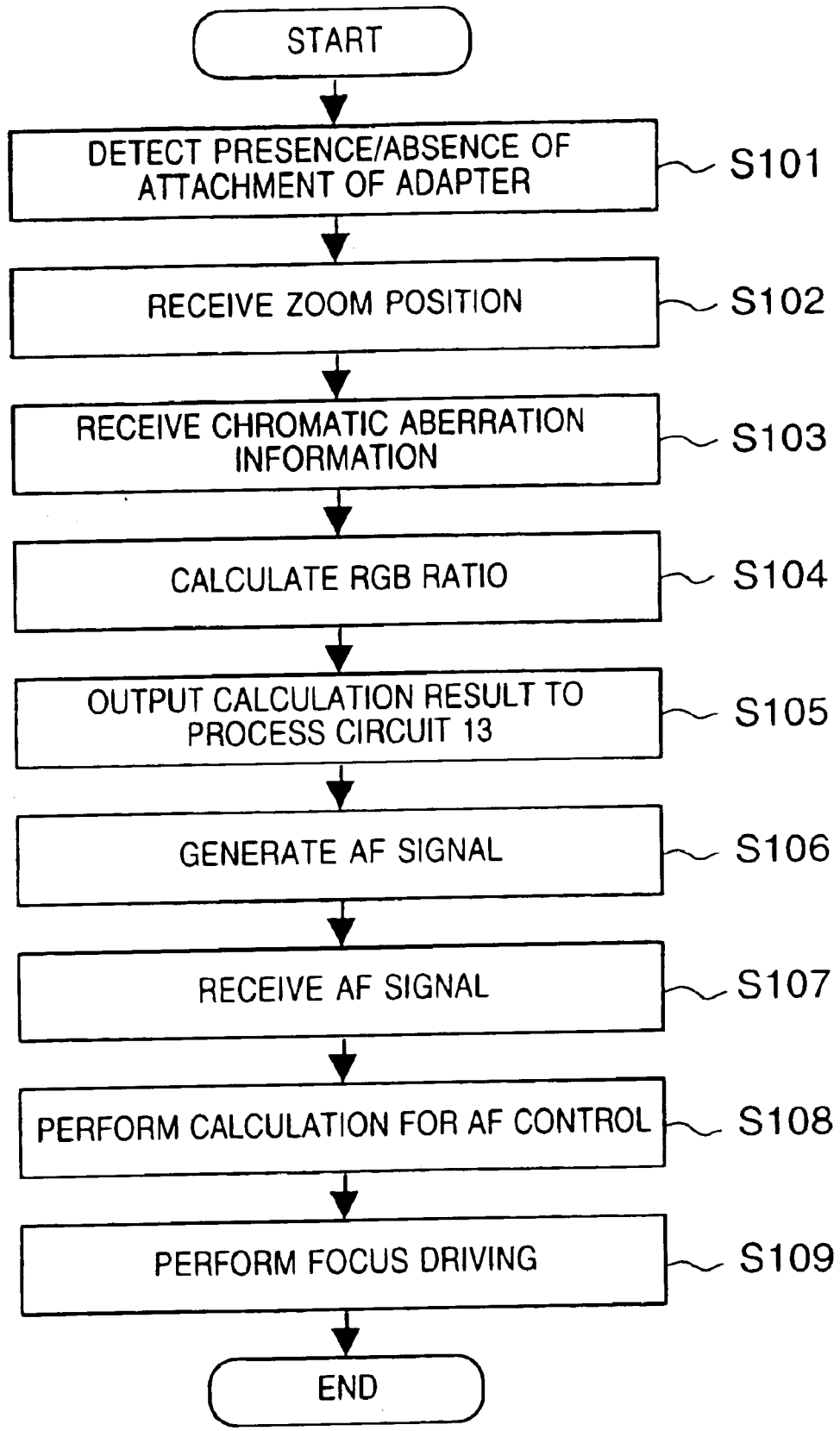
FIG. 17 is a flow chart showing the control processing procedure of the sixth embodiment.

FIG. 17 is a flow chart.

In S101, it is detected on the basis of the signal from the identification circuit 222 whether the adapter is attached between the lens and the camera, and the type of adapter is detected if it is attached. In S102, the zoom position information of the lens is received. In S103, chromatic aberration information corresponding to the detection result received in S101 and zoom position information received in S102 is received. In S104, the AF generation ratio is calculated. In S105, the calculation result obtained in S104 is output. In S106, the AF signal is generated. In S107, the output from the process circuit 213 is received. In S108, calculation for predetermined AF control is executed. In S109, focus driving is performed on the basis of the calculation result obtained in S108.

In this embodiment, an arrangement using image sensing elements of 3-CCD scheme has been described. However, an image formation position shift due to chromatic aberration also occurs in a single CCD. AF and problems due to chromatic aberration in the 3-CCD scheme also apply to a single CCD. For a single CCD as well, a light beam is color-separated by a filter, and the same effect as described above can be obtained in signal processing by complying with the present invention. The output for the signal generation means is changed by changing the AF characteristics. Calculation for this may be executed in the control circuit, and the means is not limited to this as far as it implements the function of changing the AF characteristics in accordance with chromatic aberration.

(Seventh Embodiment)

The seventh embodiment will-be described next.

Figure 18:
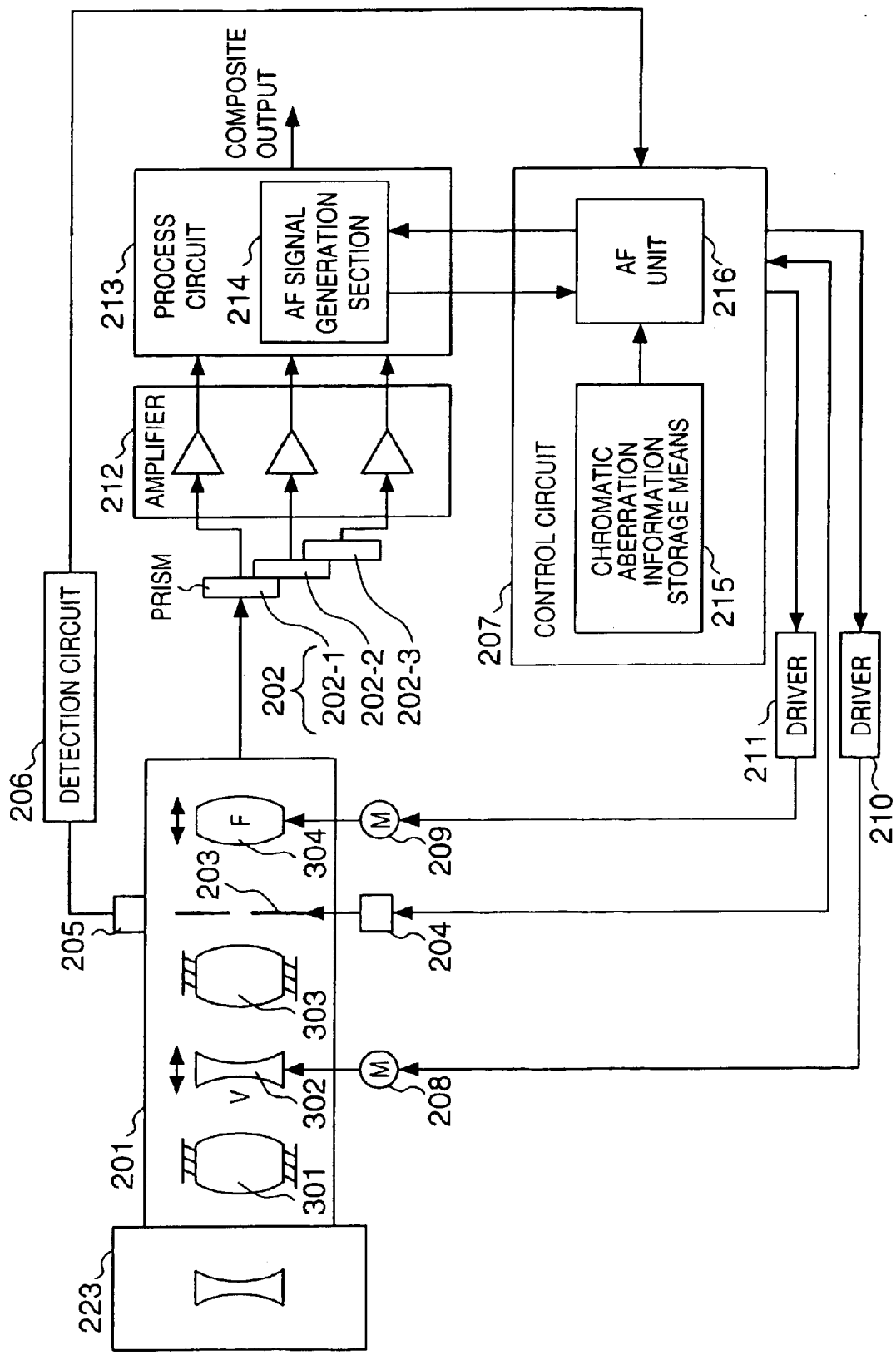
FIG. 18 is a functional block diagram showing an image sensing apparatus according to the seventh embodiment of the present invention.

FIG. 18 is a block diagram showing the seventh embodiment. The same reference numerals as in the sixth embodiment denote the same parts in the seventh embodiment, and a detailed description thereof will be omitted.

The object of this embodiment is to perform control in consideration of chromatic aberration when an optical system is attached to the front portion of a lens 201. This embodiment does not use an interchangeable lens, unlike the sixth embodiment. Even when an interchangeable lens is used, as in the sixth embodiment, the object is the same as described above, and a detailed description of the same reference numerals as in the sixth embodiment will be omitted.

Referring to FIG. 18, an adapter 224 having an optical system is, e.g., a closeup lens for reducing the focusible object distance of the lens 201. A detection circuit 225 detects whether the adapter 224 is attached. Upon detecting that the adapter 224 is attached to the front portion of the lens on the basis of the output from the detection circuit 225, a control circuit 207 obtains the chromatic aberration information of the lens system including the lens 201 and adapter 224 on the basis of stored information or stored information and calculation. In accordance with the chromatic aberration information output, the AF signal generation ratio is calculated and generated to execute AF control.

Figure 19:
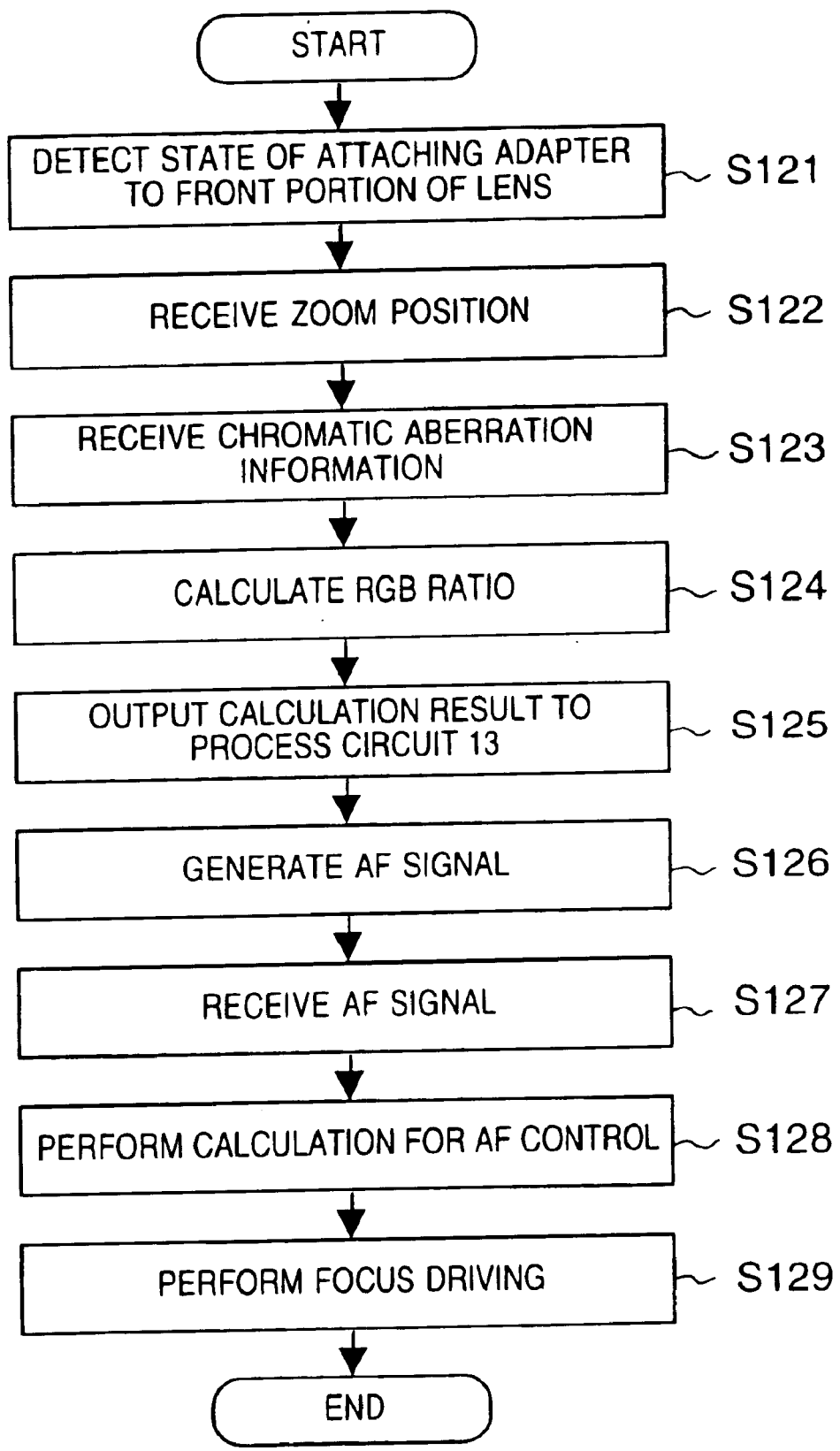
FIG. 19 is a flow chart showing the control processing procedure of the seventh embodiment.

FIG. 19 is a flow chart.

In S121, the detection circuit 225 detects whether the adapter 224 is attached to the front portion of the lens. In S122, the zoom position information of the lens is received. In S123, chromatic aberration information corresponding to the detection result received in 121 and zoom position information received in 5122 is received. In S124, the AF generation ratio is calculated. In S125, the calculation result obtained in S124 is output. In S126, the AF signal is generated. In S127, the output from the process circuit 213 is received. In S128, calculation for predetermined AF control is executed. In S129, focus driving is performed on the basis of the calculation result obtained in S128.

(Eighth Embodiment)

The eighth embodiment will be described.

Figure 20:
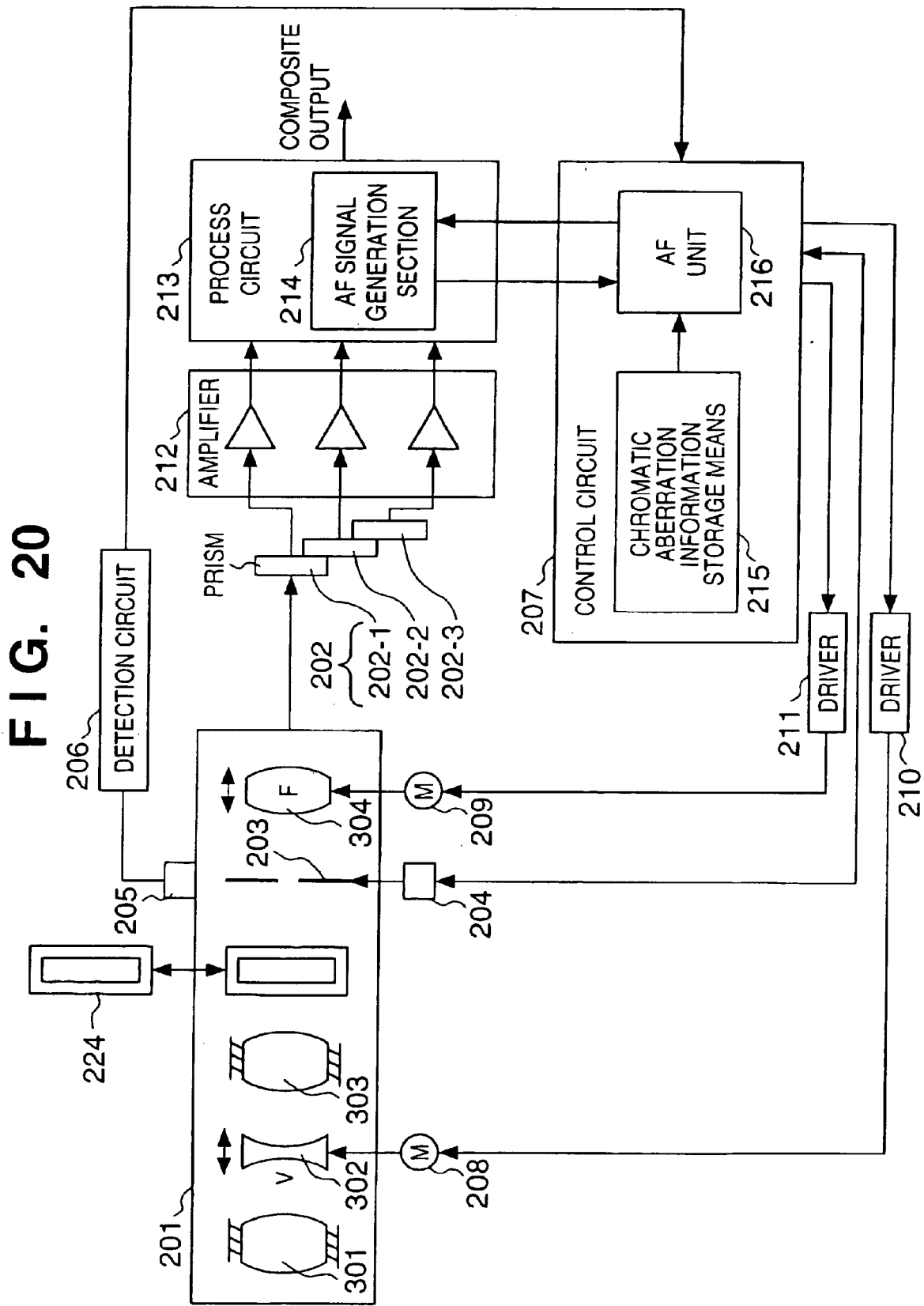
FIG. 20 is a functional block diagram showing an image sensing apparatus according to the eighth embodiment of the present invention.

FIG. 20 is a block diagram showing the eighth embodiment. The same reference numerals as in the sixth embodiment denote the same parts in the eighth embodiment, and a detailed description thereof will be omitted.

The object of this embodiment is to perform control in consideration of chromatic aberration when an optical system is attached in a lens 201. As in the seventh embodiment, this embodiment does not use an interchangeable lens, unlike the sixth embodiment. Even when an interchangeable lens is used, as in the sixth and seventh embodiments, the object is the same as described above, and a detailed description of the same reference numerals as in the sixth embodiment will be omitted.

Referring to FIG. 20, an adapter 226 having an optical system is, e.g., a wide attachment lens for decreasing the focal length of the lens 201. A detection circuit 227 detects whether the adapter 226 is attached in the lens. Upon detecting that the adapter 226 is attached in the lens, a control circuit 207 obtains the chromatic aberration information of the lens system including the lens 201 and adapter 226 on the basis of stored information or stored information and calculation. In accordance with the chromatic aberration information output, the AF signal generation ratio is calculated and generated to execute AF control.

FIG. 21 is a flow chart.

In S131, the detection circuit 227 detects whether the adapter 226 is attached in the lens. In S132, the zoom position information of the lens is received. In S133, chromatic aberration information corresponding to the detection result received in S131 and zoom position information received in S132 is received. In S134, the AF generation ratio is calculated. In S135, the calculation result obtained in S134 is output. In S136, the AF signal is generated. In S137, the output from the process circuit 213 is received. In S138, calculation for predetermined AF control is executed. In S139, focus driving is performed on the basis of the calculation result obtained in S138.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a medium such as a storage medium (or recording medium) storing software program codes for realizing the functions of the above-described embodiments to a system or apparatus, and causing the computer (or a CPU or an MPU) of the system or apparatus to read out and execute the program codes stored in the medium. In this case, the program codes read out from the medium realize the functions of the above-described embodiments by themselves, and the medium such as a storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the medium such as a storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the medium such as a storage medium, it stores program codes corresponding to the above-described flow chart (shown in FIGS. 4, 9, 11, 12, 13, 17, 19, or 21).

The embodiments of the present invention have been described above. The present invention is not limited to the contents disclosed in the above embodiments and can be applied to any constitution as long as it can implement the functions of the appended claims or the functions of the embodiments.

For example, in the above embodiments, the AF signal is formed in consideration of all the red, green, and blue component signals. Only one (especially, the green component signal) or two color component signals may be used to form the AF signal, as needed.

The separated color component signals may be different from those of the above embodiments, as needed.

In the above embodiments, the separated color component signals are resynthesized, and then, the AF signal is formed. Instead, the AF signal may be formed before or without resynthesis.

In the above embodiments, the chromatic aberration information of the adapter is used together with the chromatic aberration information of the optical system. However, only the chromatic aberration information of the adapter may be used, as needed.

In the above embodiments, the AF signal is used to drive the optical system. However, the AF signal may be used for display.

The present invention may be applied to only the optical system, only the image sensing apparatus to which the optical system is attached, or both the optical system and the apparatus to which the optical system is attached.

The software and hardware configurations of the above embodiments can be appropriately replaced.

The present invention may be implemented by combining the above embodiments or the technical element thereof as needed.

In the present invention, all or some of the appended claims or embodiments may form one apparatus, be connected to another apparatus, or be an element of an apparatus.

The present invention can be applied to various cameras including an electronic camera such as a video camera capable of sensing a moving image or still image, a camera using a silver halide film, a camera whose image sensing lens is interchangeable, a single-lens reflex camera, a lens shutter camera, and a monitor camera, an image sensing apparatus, optical apparatus, or other apparatuses other than cameras, an apparatus, method, and computer-readable storage medium applied to. the cameras, image sensing apparatus, optical apparatus, or other apparatuses, and the elements thereof As has been described above, according to the above-embodiment invention, an apparatus such as a focus adjustment apparatus capable of appropriately adjusting focusing in accordance with chromatic aberration, a control method therefor, and a medium such as a storage medium for supplying a control program therefor can be provided.

As many apparently widely different embodiments of the present invention can be made without departing from the spirit and scope thereof, it is to be understood that the invention is not limited to the specific embodiments thereof except as defined in the appended claims.

What is claimed is:

1. A focus adjustment apparatus comprising:
    a color component signal forming circuit for forming a plurality of color component signals corresponding to predetermined different color components of object light received through an optical system; and
    a focus adjustment signal forming circuit for forming a signal for focus adjustment on the basis of a signal formed by changing a ratio of the plurality of color component signals formed by said color component signal forming circuit,
wherein the ratio of the plurality of color component signals includes a case wherein a ratio of at least one color component signal is set to zero.

2. The apparatus according to claim 1, wherein said focus adjustment signal forming circuit forms the signal for focus adjustment on the basis of a signal formed by synthesizing the plurality of color component signals in accordance with the ratio.

3. The apparatus according to claim 1, wherein said focus adjustment signal forming circuit changes the ratio of the plurality of color component signals on the basis of chromatic aberration information of the optical system.

4. The apparatus according to claim 3, wherein said focus adjustment signal forming circuit changes the ratio of the plurality of color component signals, including chromatic aberration information of an auxiliary optical system used together with the optical system.

5. A focus adjustment apparatus comprising:
    a color component signal forming circuit for forming a plurality of color component signals corresponding to predetermined different color components of object light received through an optical system; and
    a focus adjustment signal forming circuit for forming a signal for focus adjustment on the basis of a signal formed by changing a ratio of the plurality of color component signals formed by said color component signal forming circuit, wherein said focus adjustment signal forming circuit changes the ratio of the plurality of color component signals on the basis of chromatic aberration information corresponding to a focal length of the optical system.

6. The apparatus according to claim 5, wherein said focus adjustment signal forming circuit changes the ratio of the plurality of color component signals, including chromatic aberration information of an auxiliary optical system used together with the optical system.

7. A focus adjustment apparatus comprising:
    a color component signal forming circuit for forming a plurality of color component signals corresponding to predetermined different color components of object light received through an optical system; and
    a focus adjustment signal forming circuit for forming a signal for focus adjustment on the basis of a signal formed by changing a ratio of the plurality of color component signals formed by said color component signal forming circuit, wherein said focus adjustment signal forming circuit changes the ratio of the plurality of color component signals on the basis of chromatic aberration information corresponding to an opening degree of an aperture of the optical system.

8. The apparatus according to claim 7, wherein said focus adjustment signal forming circuit changes the ratio of the plurality of color component signals, including chromatic aberration information of an auxiliary optical system used together with the optical system.

9. A focus adjustment apparatus comprising:
    a color component signal forming circuit for forming a plurality of color component signals corresponding to predetermined different color components of object light received through an optical system; and
    a focus adjustment signal forming circuit for forming a signal for focus adjustment on the basis of a signal formed by changing a ratio of the plurality of color component signals formed by said color component signal forming circuit, wherein said focus adjustment signal forming circuit changes the ratio of the plurality of color component signals on the basis of chromatic aberration information corresponding to a focal length of the optical system and an opening degree of an aperture.

10. The apparatus according to claim 9, wherein said focus adjustment signal forming circuit changes the ratio of the plurality of color component signals, including chromatic aberration information of an auxiliary optical system used together with the optical system.

11. A focus adjustment apparatus comprising:
    a color component signal forming circuit for forming a plurality of color component signals corresponding to predetermined different color components of object light received through an optical system; and
    a focus adjustment signal forming circuit for forming a signal for focus adjustment on the basis of a signal formed by changing a ratio of the plurality of color component signals formed by said color component signal forming circuit, wherein said focus adjustment signal forming circuit changes the ratio of the plurality of color component signals on the basis of chromatic aberration information of an auxiliary optical system used together with the optical system.

12. The apparatus according to claim 4, wherein the auxiliary optical system increases the focal length of the optical system.

13. The apparatus according to claim 6, wherein the auxiliary optical system increases the focal length of the optical system.

14. The apparatus according to claim 8, wherein the auxiliary optical system increases the focal length of the optical system.

15. The apparatus according to claim 10, wherein the auxiliary optical system increases the focal length of the optical system.

16. The apparatus according to claim 11, wherein the auxiliary optical system increases the focal length of the optical system.

17. The apparatus according to claim 4, wherein the auxiliary optical system decreases the focal length of the optical system.

18. The apparatus according to claim 6, wherein the auxiliary optical system decreases the focal length of the optical system.

19. The apparatus according to claim 8, wherein the auxiliary optical system decreases the focal length of the optical system.

20. The apparatus according to claim 10, wherein the auxiliary optical system decreases the focal length of the optical system.

21. The apparatus according to claim 11, wherein the auxiliary optical system decreases the focal length of the optical system.

22. The apparatus according to claim 4, wherein the auxiliary optical system increases a focusible object distance of the optical system to a closeup side.

23. The apparatus according to claim 6, wherein the auxiliary optical system increases a focusible object distance of the optical system to a closeup side.

24. The apparatus according to claim 8, wherein the auxiliary optical system increases a focusible object distance of the optical system to a closeup side.

25. The apparatus according to claim 10, wherein the auxiliary optical system increases a focusible object distance of the optical system to a closeup side.

26. The apparatus according to claim 11, wherein the auxiliary optical system increases a focusible object distance of the optical system to a closeup side.

27. The apparatus according to claim 3, characterized by further comprising a storage unit for storing the chromatic aberration information.

28. The apparatus according to claim 27, wherein said storage unit is provided in the optical system, said focus adjustment signal forming circuit is provided in an image sensing apparatus main body to which the optical system is attached, and said apparatus further comprises a transmission section for transmitting the chromatic aberration information stored in said storage unit from the optical system to the image sensing apparatus main body.

29. The apparatus according to claim 1, wherein said apparatus further comprises an image sensing section for receiving the object light received through the optical system and converting the object light into an image signal for image sensing, and said color component signal forming circuit forms the plurality of color component signals on the basis of the image signal from said image sensing section.

30. The apparatus according to claim 1, wherein the plurality of color component signals include at least two of a red component signal, a green component signal, and a blue component signal.

31. The apparatus according to claim 1, wherein one of the plurality of color component signals includes a green component signal, and said focus adjustment signal forming circuit changes the ratio of the plurality of signals mainly in consideration of the green component signal.

32. The apparatus according to claim 1, further comprising a detector for detecting focal length information of the optical system from a moving position of the optical system.

33. The apparatus according to claim 1, wherein said focus adjustment apparatus is provided in the optical system.

34. The apparatus according to claim 1, wherein said focus adjustment apparatus is provided in the image sensing apparatus main body to which the optical system is attached.

35. The apparatus according to claim 1, wherein said focus adjustment apparatus is provided in an image sensing system comprising the optical system and the image sensing apparatus main body to which the optical system is attached.

* * * * *

UNITED STATES PATENT AND TRADEMARK OFFICE
CERTIFICATE OF CORRECTION

Figure 5:
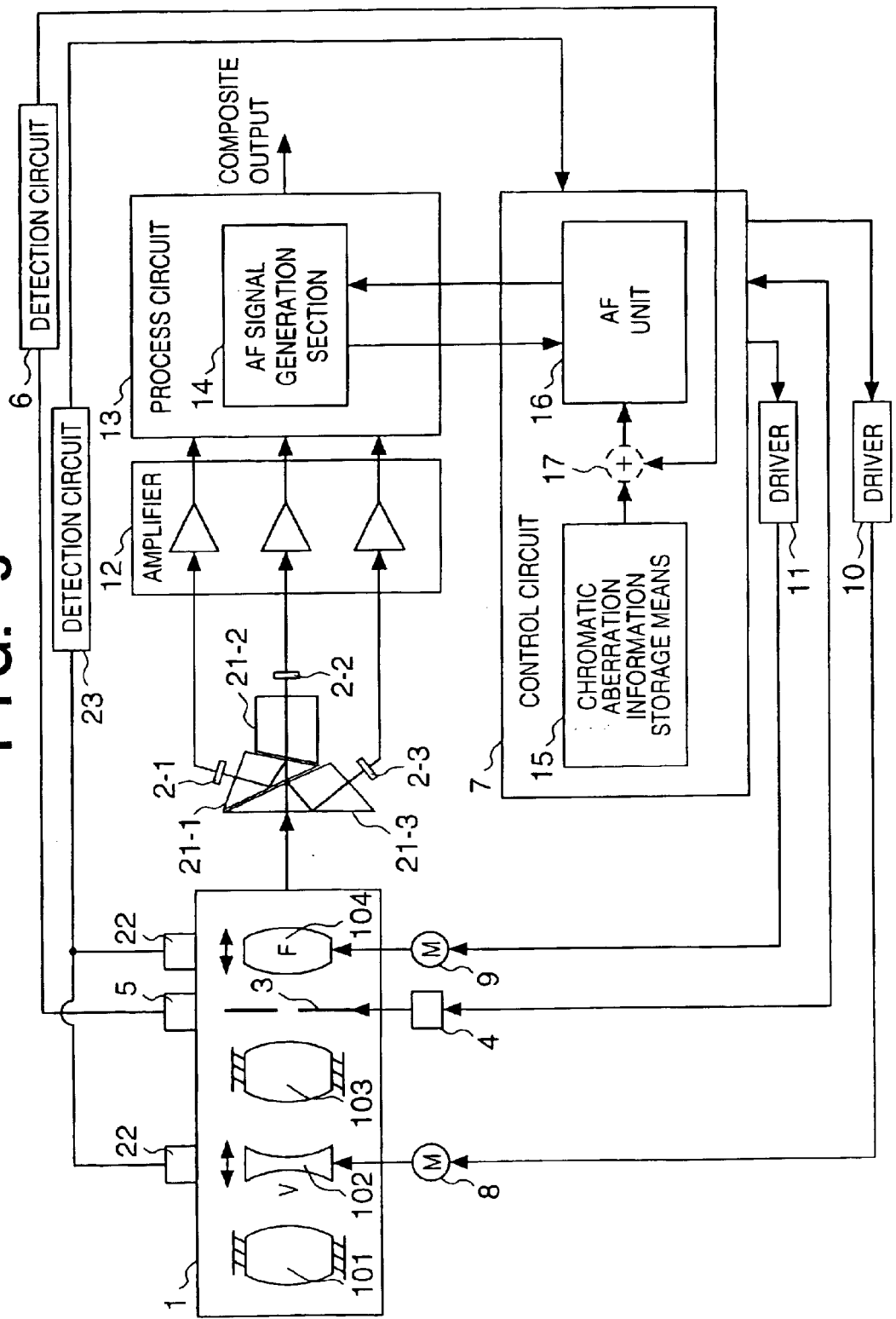
FIG. 5 is a functional block diagram showing an image sensing apparatus according to the second embodiment of the present invention.

PATENT NO. : 6,963,388 B1
APPLICATION NO. : 09/649128
DATED : November 8, 2005
INVENTOR(S) : Seiya Ohta It is certified that error appears in the above-identified patent and that said Letters Patent is hereby corrected as shown below:

In Column 1, Line 37, between the words "beam" and "the" the language -- from an object is separated by a prism or the like into three primary colors: red (R), green (G), and blue (B),-- should be inserted;

In Column 2, Lines 41-54, should be broken into two paragraphs, i.e., the last two lines thereof, from "FIG. 3" to "aberration;" should be its own paragraph;

In column 2, Lines 55-58, should be broken into two paragraphs, i.e., the last three lines thereof, from "FIG. 5" to "invention;", should be its own paragraph;

In Column 4, Line 7, the "6i" should be deleted;

In Column 5, Lines 41-56, should be broken into two paragraphs, i.e., the last 9 lines thereof, from "FIG. 2" to "positions." should be its own paragraph; and In Column 11, Lines 33-49, should be broken into two paragraphs, i.e., the last 4 lines thereof, from "FIG. 15A-2" to "separated" should be its own paragraph, and a --.-- (period) should be added after the word "separated".

Signed and Sealed this

Eighth Day of August, 2006

JON W. DUDAS
*Director of the United States Patent and Trademark Office*